United States Patent
Karchov et al.

(10) Patent No.: US 11,115,367 B2
(45) Date of Patent: Sep. 7, 2021

(54) SYSTEM AND METHOD FOR AUTOMATING WORKFLOW MANAGEMENT AND TRACKING OF VOICEMAIL, TEXT AND MULTIMEDIA MESSAGES, LIVE CHATS, FORMS AND UPLOADED FILES

(71) Applicant: Entrespace, LLC, West Hartford, CT (US)

(72) Inventors: Michael Karchov, Farmington, CT (US); Jeffrey R. Miller, Natick, MA (US)

(73) Assignee: Entrespace, LLC, West Hartford, CT (US)

( * ) Notice: Subject to any disclaimer, the term of this patent is extended or adjusted under 35 U.S.C. 154(b) by 0 days.

(21) Appl. No.: 16/998,239

(22) Filed: Aug. 20, 2020

(65) Prior Publication Data
US 2021/0058356 A1 Feb. 25, 2021

Related U.S. Application Data

(60) Provisional application No. 62/889,458, filed on Aug. 20, 2019.

(51) Int. Cl.
*G06F 3/0481* (2013.01)
*H04L 12/58* (2006.01)

(52) U.S. Cl.
CPC .......... *H04L 51/22* (2013.01); *G06F 3/0481* (2013.01)

(58) Field of Classification Search
CPC ......... H04L 51/22; H04L 51/04; H04L 51/16; G06F 3/0481
See application file for complete search history.

(56) References Cited

U.S. PATENT DOCUMENTS

| | | | |
|---|---|---|---|
| 8,224,915 B2 | 7/2012 | Malik et al. | |
| 9,489,460 B2 | 11/2016 | Wexler et al. | |
| 10,461,945 B2 * | 10/2019 | Wanderski | H04L 67/22 |
| 2011/0282953 A1 | 11/2011 | Lee et al. | |
| 2012/0197975 A1 * | 8/2012 | Samson | H04L 51/14 709/203 |
| 2013/0066988 A1 * | 3/2013 | Levinson | G06Q 10/107 709/206 |
| 2015/0100503 A1 | 4/2015 | Lobo et al. | |
| 2015/0178371 A1 * | 6/2015 | Seth | G06F 16/3329 707/748 |
| 2017/0372324 A1 * | 12/2017 | Frosst | G06Q 30/016 |
| 2019/0272547 A1 * | 9/2019 | Coman | G06N 3/08 |
| 2020/0348991 A1 * | 11/2020 | Rhodes | G06F 16/903 |

OTHER PUBLICATIONS

Bai Xuefu et al., Design and Implementation of Web Instant Message System Based on XMPP, Jun. 1, 2012, IEEE, pp. 1-6 (Year: 2012).*

Christine A. Halverson, The Value of Persistence: A Study of the Creation, Ordering and Use of Conversation Archives by a Knowledge Worker, Jan. 1, 2004, IEEE Xplore, pp. 1-10 (Year: 2004).*

\* cited by examiner

*Primary Examiner* — Tam T Tran
(74) *Attorney, Agent, or Firm* — Ziegler IP Law Group, LLC

(57) ABSTRACT

A system and method for automating workflow management and tracking of voicemail, text and multimedia messages, live chats, forms and uploaded files is provided.

29 Claims, 21 Drawing Sheets

Fig. 8

Fig. 9 find people, chats, rooms...    Home Page | Live Chat Visitor 0001 (IP:71.80.98.11, Avon, CT) Jun 6, 2018, 4:04 PM    Archive

Common Chat Rooms
CttO Auto-Attendant | Voicemail
CttO Auto-Attendant | Text Messages
Contact Us | Form [3]
Home Page | Client Upload Portal
Home page | Live Chat

Specialty Chat Rooms
Project X1D
Geneva [7]
Company - All Hands

Contacts
John Able
Jane Doe
Peter Edwards [5]
Richard Johnson

Visitor 0001 IP:71.80.98.11, Avon, CT)
Win10 Jun 6, 2018, 4:04 PM
Visitor 0002 (IP:71.80.99.11, Simsbury, CT)
MacOS Jun 6, 2018, 4:08 PM
Visitor 0003 (IP:98.80.99.11, Chicago, IL)
MacOS 10.14 Jun 6, 2018, 4:12 PM Visitor 0001 IP:71.80.98.11 Jun 6, 2018, 4:04PM
Hi, how long does it take to deploy your service usually?

John Able Jun 6, 2018, 4:06PM
I will be happy to answer you question.
How many users are in your organization?

Visitor 0001 IP:71.80.98.11 Jun 6, 2018, 4:06PM
31 users in total

John Able Jun 6, 2018, 4:07PM
Team, do we need to get any other input?

Richard Johnson Jun 6 2019, 4:07PM
This is relatively small. We probably do not need anything else.
It usually takes about one calendar week from start to finish.
Will it work for you? Do you have any other questions?

Type a message

Find people, chats, rooms

Common Chat Rooms
CHQ Auto-Attendant | Voicemail
CHQ Auto-Attendant | Text Messages
Home page | Live Chat *
Contact Us | Form
Home Page | Client Upload Portal
* Aggregated View | By client

Specialty Chat Rooms
Project X1D
Geneva *
Company – All Hands

Contacts
John Able
Jane Doe
Peter Edwards *
Richard Johnson

By Client | John Smith +1 617-555-1212

+1 617-555-1212, 781-555-1212 John Smith
+1 212-555-1212 Jane Doe
+1 781-555-1212 Peter Jones +1-617-555-1212, 781-555-1212 Apr 2, 2019, 3:52PM
Hi this is John from innocentral electric.
I'm here with Joe Smith. We trying to find out more about your upcoming webinar next Tuesday.

John Able Apr 2, 2019, 3:56PM via Auto-Attendant 860-555-1000
Are you asking about the webinar about new release that Sara Peters is hosting?

+1-617-555-1212 Apr 2, 2019, 3:57PM
Yes

John Able Apr 2, 2019, 4:01PM via Auto-Attendant 860-555-1000
How can I help?

+1-781-555-1212 Apr 2, 2019, 4:02PM
Do you know if it will cover the support options?

Richard Johnson Apr 2, 2019, 4:04PM via Auto-Attendant 860-555-1000
No, there will be a separate webinar about all the support offerings for the new release Voicemail Apr 3, 2019, 3:33PM Duration 33s
"This is John. Can you please call me back when you have a min. 617-555-1212"
Play Message Authorization for recurring payment | Form Apr 13, 2019, 3:33PM
View Form Copy of the Government Issued photo ID | Uploaded file Apr 23, 2019, 3:33PM
View File

Fig. 13

| | | |
|---|---|---|
| Initiated | 7/15/2018 10:13:10 | 7/28/2018 10:13:10 |
| Visitor | 617-555-1212 | 212-555-1212 |
| Type | Voicemail | Text message |
| Communication Mechanism | Auto-attendant - CHQ | Auto-attendant - CHQ |
| ContactID | @JohnSmith29050 | @JaneDoe59609 |
| Tags | #webinar390 | |
| Opened | 7/15/2018 10:20:10 | 7/28/2018 10:20:10 |
| Opened by | James Brown | Peter Jones |
| Last Action | 8/29/2018 10:13:10 | 7/28/2018 21:01:10 |
| Last Action by | John Doe | Jane Brown |
| Last Status | Waiting for callback | Completed |
| Status Updated | 7/15/2018 10:48:58 | |
| Status Updated by | Peter Jones | |
| Completed | | 7/28/2018 21:01:10 |
| Completed by | | James Brown |

Fig. 14

| Initiated | Visitor | Type | Mechanism | ContactID | Tags | Status | Status Updated | Updated By |
|---|---|---|---|---|---|---|---|---|
| 7/15/2018 10:13:10 | 617-555-1212 | Voicemail | Auto-attendant - C | @JohnSmith25 | #webinar3 | Wait callback | 7/15/2018 11:13:10 | Jane Doe |
| 7/28/2018 21:22:46 | 212-555-1212 | Text message | Auto-attendant - C | @JaneDoe59609 | | Completed | 7/28/2018 23:41:00 | Edward Jones |
| 8/11/2018 8:32:22 | 781-555-1212 | Text message | Auto-attendant - C | @InnocentralElectric | | Completed | 8/15/2018 10:13:10 | John Doe |
| 8/24/2018 19:41:58 | (p(8.8.8.8) | Live Chat | Home Page | | #entrs.com | Completed | 8/24/2018 22:00:12 | Peter Brown |
| 9/7/2018 6:51:34 | (p(7.7.7.7) | Live Chat | Home Page | | #officeflo | Completed | 9/7/2018 9:09:48 | John Doe |
| 9/20/2018 18:01:10 | jsmith@gmail | Recurring payme | Billing Page | @JohnSmith25 | #newclient | Opened | 9/20/2018 20:19:24 | John Doe |
| 10/4/2018 9:10:46 | jones@aol.con | Copy of the Govt | Client sign-up pag | @PeteJones45 | #newclient | Verifying | 10/4/2018 7:29:00 | Edward Jones |

Fig. 15

SYSTEM AND METHOD FOR AUTOMATING WORKFLOW MANAGEMENT AND TRACKING OF VOICEMAIL, TEXT AND MULTIMEDIA MESSAGES, LIVE CHATS, FORMS AND UPLOADED FILES

CROSS-REFERENCE TO RELATED APPLICATION

This application claims the benefit of U.S. provisional application No. 62/889,458 filed Aug. 20, 2019, the contents of which are incorporated herein by reference in their entirety.

BACKGROUND OF THE INVENTION

Tracking and responding to incoming communications received through a variety of different mechanisms and communication channels, such as a voicemail system, text or multimedia messaging app, social media app, live chat widget, online forms or files uploaded through an online portal, can be time consuming and labor intensive, as it requires access to and use of different systems, apps and tools, one at a time. The number of different types of communications used between businesses and organizations, and their clients, users and partners is growing overtime. For example, in the past much of communications were done through sending paper documents in envelopes, by fax, or email, by phone or in person. Yet in recent years it's becoming more common and more popular to use live chat, text messaging, social media messaging, and other text and multimedia messaging apps.

Manually consolidating and documenting all incoming communications into one Workflow Management System (WfM System), and manually updating the status on each of the items can be time consuming and labor intensive, requiring a person to spend extra time to copy, enter and update relevant information.

On the other hand, not tracking incoming communications may result in overlooking or missing an important message, or not responding or reviewing it in time, which in turn can impact client, customer or partner satisfaction, cause missed business opportunities, and potentially can damage the standing and brand image of an organization.

If several people are involved in monitoring and handling incoming communications, it may require some level of coordination and collaboration. Collaborating and coordinating about who will respond to a received voicemail and how, may not be trivial if the individual apps and systems (e.g., the voicemail app) do not provide a mechanism to add comments, manage status, exchange messages or document discussions. Using a different system—for example, an organization's Instant Messaging System (IM System)—to coordinate responses and activities to handle incoming communications, can make it difficult to track status and keep relevant information organized.

Instant messaging has become an essential part of the daily workflow for many companies. Current IM Systems offer a mechanism to have one-to-one or one-to-many chats, or to participate in chat rooms, channels or groups. Yet, the instant messaging tools typically are not integrated with other systems and tools, such as live chat, texting and multimedia messaging apps, voicemail systems, online forms, or upload portals.

Discussions about the communications received from External Parties between multiple team members in the IM System may require manually copying the content from the received communications into the IM System, adding unnecessary time-consuming and labor-intensive efforts. The effort and time required to switch between different applications, for example, between voicemail app and the IM System, or between a live chat and the IM System, is not productive and could be error prone, slowing down the performance of a team or individuals.

SUMMARY OF THE INVENTION

In one aspect, there is disclosed herein a method and system for three-way integration of external communication mechanisms with an organization's Instant Messaging (IM) System and its Workflow Management (WfM) System, wherein the IM System comprises a Chat Room, the method and system comprising:

a) receiving and storing a communication containing content from an external party through a communication mechanism);

b) automatically generating a Collaboration Space within the IM System's Chat Room associated with the specific instance of the communication mechanism used to receive the communication;

c) automatically generating a message within the newly created Collaboration Space and populating it with the content and/or information about the content of the received communication; and d) automatically generating and populating a record in the WfM System to track the status and progress of handling the received communication.

Non-limiting examples of such communications include voicemail, text messages, live chat, online forms, a portal for uploading files, and social media messaging.

In one optional embodiment, the Collaboration Space comprises a Chat Window, and an authorized user can use the Chat Window in the IM System to send and receive communications through interactive external communication mechanisms.

In an alternative optional embodiment, the Collaboration Space comprises a Chat Window, and an authorized user can use the Chat Window of the Collaboration Space in the IM System to access one-way incoming communications received from non-interactive external communication mechanisms In another optional embodiment, an authorized user can use the Chat Window of the Collaboration Space in the IM system to coordinate and/or collaborate with others on addressing and handling received communications, and have private discussions not visible to external parties.

In another optional embodiment, the Collaboration Space comprises a Chat Window, and the Chat Window is configured to (A) document one or more of observations, status, findings, comments, outcomes, planned or needed action items while addressing or handling received communications and to (B) track execution of the action items.

In another optional embodiment, an authorized user can use the Chat Window of the Collaboration Space in the IM system to review and close-out the workflow required to address or handle received communications.

In another optional embodiment, the Collaboration Space comprises a Chat Window, and a record in the WfM System is automatically updated with one or more captured attributes (such as, for example, a date and time stamp, ID of the authorized user, and action performed by the authorized user, etc.) each time a new activity occurs in the corresponding Chat Window of the Collaboration Space. Such activities may include each time the Chat Window of the corresponding Collaboration Space is first opened by an authorized user, and each time a new message is added to the Chat Window of the corresponding Collaboration Space, or each time the corresponding Collaboration Space is archived.

In another optional embodiment, an authorized user can retrieve and view one or more previously archived Collaboration Spaces to access all their original content, including the received communication and all messages that were entered by the participants of the Collaboration Space from the moment it was created until it was archived.

In another optional embodiment, the Collaboration Space comprises a Chat Window, and an authorized user can add a new user-defined Tag to a message in a Chat Window of the Collaboration Space or view, select and assign one or more existing Tags. Sample Tags include an identifier prepended with a #symbol, e.g., #ProductXYZ, etc. The Tags can be visible only internally and not visible to the external parties that are part of the communication.

In another optional embodiment, the Collaboration Space comprises a Chat Window, and the IM system is configured to automatically generate suggested Tags for communications in the Chat Room based on the external party in which sent the communication, and/or based on the content of the messages in the Chat Window of the Collaboration Space.

In another optional embodiment, the Collaboration Space comprises a Chat Window, and an authorized user can accept (and add) or reject automatically suggested Tags to the messages in the Chat Window of the Collaboration Space. Optionally, the Tags are automatically color-coded and highlighted with a distinct background pattern in a Chat Window.

According to another option, each of the assigned Tags to a Chat Window of the Collaboration Space is automatically added to a corresponding record in the WfM system.

In another optional embodiment, the Collaboration Space comprises a Chat Window and is configured to permit an authorized user to add a Status Code directly in the Chat Window. By way of illustration, a Status Code may be created by prepending a word or a short expression with a special symbol (e.g., a word prepended with ^character— such as ^Waiting_for_callback), as a part of a message or as a standalone entry. The last Status Code in each message may be automatically added to the Status field in the corresponding WfM record. The Status Code can be visible only internally and not visible to the external parties that are part of the communication. Optionally, the Status Codes are automatically color-coded and highlighted with a distinct background pattern in a Chat Window.

In another optional embodiment, Collaboration Space comprises a Chat Window, and an authorized user can assign a new Contact ID to a message in a Chat Window or view, select and assign one or more existing Contact IDs. By way of example, a Contact ID may comprise text such as a name prepended with a @ symbol, e.g., @JohnSmith. The Contact IDs can be visible only internally and not visible to the external parties that are part of the communication.

In another optional embodiment, the IM is configured automatically generate suggested Contact IDs for assignment to a message in the Chat Window based on an external party associated with the message, or based on the content of the message, or both. Optionally, an authorized user can accept (and assign) or reject automatically suggested Contact IDs. As another option, the method and system may be configured to automatically color-code and highlight each Contact ID assigned to a Chat Window with a distinct background pattern. In one example, the method and system may be configured to add to the WfM system a record corresponding to each Contact ID in the Collaboration Space.

In another optional embodiment, access to the Chat Room is limited to members and an authorized user can add private comments to Chat Windows in that Chat Room that are visible only to members. By way of illustration, a private comment may be created using an on-screen menu or a special syntax (e.g., prepending the line with \\ to make comments through the end of the line as private, or embedding private comments between << and >>. The private comments can be visible only internally and not visible to the external parties that are part of the communication. Optionally, the private comments are automatically color-coded and highlighted with a distinct background pattern in the Chat Window. According to another aspect, an authorized user may be enabled to hide and unhide private comments in the Chat Window of the Collaboration Space in the IM System.

In another optional embodiment, a link in the WfM system record is generated automatically to access information and details about corresponding communication, including the Collaboration Space with all the documented discussions, comments, conclusions and other interactions that occurred in the process of handling the received communication, all for purposes such as auditing, performing reviews, quality control and training.

In yet another optional embodiment, the status information on different types of communications is automatically consolidated into a single WfM System, allowing users to view at a glance communications that have been received and not yet handled, regardless of the type of communication.

In yet another optional embodiment, the method and system is configured to generate workflow reports which are configured, customized per user preferences based on the content maintained in the WfM system. For example, reports with the trends related to different types of attributes or parameters of the received communications, such as frequency, types of communications (e.g., voicemails, text messages, live chats), mechanisms and properties that were used to receive communications, geographic location of the external party from where the communication was conducted, closure rate (how many unprocessed communications have been closed per time period), turn around rate (how long it takes from the time a communication has been received until it was handled), Private user-defined Tags, Contact IDs of external parties.

In still another optional embodiment, the method and system is configured to enable an authorized user to view a subset of the WfM records that match one or more criteria selected by the user.

According to another optional embodiment, the method and system is configured to generate reports with the details and status on all received communications either on demand or distributed periodically (e.g., hourly, daily, weekly etc.) per user preferences, or both.

In another optional embodiment, the system and method is configured to suggest a link between two or more Collaboration Spaces based on one or more of the external party who sent the communication, the content of the messages, a tag, or a Contact ID. Possibly, the system and method may be configured to enable an authorized user to link two or more Collaboration Spaces. In one embodiment, any of the linked Collaboration Spaces can be displayed at the same time, e.g., for a cross reference.

Optionally, the system and method are configured to enable an authorized user to view of all Collaboration Spaces in one read-only automatically generated Chat Window related to one or more specific Contact IDs, one or more specific Private Tags, or to one or more Status Codes.

One or more embodiments of the present invention provides a system and method to consolidate numerous received communications in one place, and to create and maintain a self-contained, documented copy of the messages, exchanges, and comments related to each of the received communications that can be easily found, viewed and accessed at any time if needed later, perhaps for quality control, audit or training purposes. In addition, the present invention enables coordination and collaboration on received communications, as well as tracking the status of handling of received communications. In one or more embodiments may have one or more of the features described herein, such as providing a method and system which automatically generates and updates records in the WfM System for each received external communication, and that enables the IM System for (A) handling two-way and one-way communications with external parties, (B) internal coordination and collaboration with authorized co-workers when handling received external communications and (C) tracking, documenting and sharing observations and progress related to each of the received external communications.

In the context of the present invention, an example of communication can be a voicemail message, or a text messaging session, or a live chat session, or an online form or a file uploaded through a website. A communication can be bi-directional, such as a text messaging session or a live chat session, or uni-directional, such as a voicemail message, a notification about an uploaded file, or a notification about a submitted form. Bi-directional communications typically have a certain lifecycle, a process with a beginning and an end. For example, a text messaging session starts when the first message is sent and continues until both parties consider it finished.

The present invention provides a system and method that can help (A) minimize the risk of overlooking any of the incoming communications or the risk of delays in handling incoming communications, (B) minimize the need for switching between different tools and applications, reducing time spent switching between applications such as voicemail, live chat, text messaging, or online forms (these time savings cover the mechanics of switching and cognitive re-engagement), and (C) simplify review, documentation of observations and findings, and coordination and collaboration while handling incoming communications. By integrating communication mechanisms with an IM System and WfM System into a focused workplace, the present invention can help facilitate working faster and smarter both within and outside of the organization. It can help Increase worker productivity, improve collaboration and information sharing, save users' time. It can reduce complexity and the amount of effort to coordinate and collaborate
  Reducing unnecessary calls or in-person interruptions, reduce the number and duration of meetings.
  Eliminating the need to copy information from communication mechanisms (e.g., a voicemail app, live chat app or text messaging app) to the IM System or email, etc.
Improve worker satisfaction, reduce stress and help maintain peace of mind
  More information in one place—a single dashboard with the status of handling received communications.
  Fewer worries about missing a received communication or failing to respond in time.
Improve the quality of decisions and reduce the time needed to make those decisions
  Integration of incoming communications with the IM System makes it easier to understand the conversation context—more clarity and less confusion, which in turn make it easier to reach better, smarter and more informed decisions.
  Easier to capture learning from external communications in real time in one place.
Provide a better way to audit what happened, as well as to help improve practices or processes through better tracking
  Conversations are automatically documented while using the IM System.
  Easier traceability—it's easier to pin-point and identify the issue after the fact if something goes wrong.
Consolidate multiple communications in one place to save time and simplify workload
  Less time searching: find the needed information easier and faster.
  Less time to get up to speed: access documented conversations, findings, observations, comments, and outcomes in real-time.
  Easier to share information about received communications and find content, easier to confer with peers in real-time—easier to coordinate and collaborate on handling incoming communications whether it's responding to voicemails, text messages or live chat messages.
  Easier to review and process forms and uploaded files.

In addition, the present invention provides a system and method for tracking and analyzing trends related to the frequency, types, and sources of the incoming communications, as well as metrics related to the execution of activities needed to handle incoming communications.

In one aspect of the present invention, a method allows fully automated tracking of the workflow of communications initiated through live chat, text, multimedia and voicemail messages, social media messages, fax communications, as well as notifications received from submitted forms and uploaded files, or through other mechanisms.

The intent is to eliminate as much manual effort as possible (A) by adding new records to a Workflow Management System (WfM System) automatically each time a new communication is received from an external party (e.g., a new voicemail message is received, or each time a new live chat, text or multimedia message is received, or a new form is submitted or a file is uploaded through a website, or a mobile app), and (B) by updating WfM System records automatically based on the actions of authorized users in their IM System (such as reviewing or accessing the incoming communication, initiating discussion or adding comments, or archiving the discussion after the needed work action has been completed). The intent is to ensure that the workflow records for managing and tracking of incoming communications are fully complete, accurate and up to date. This ensures that responsible stakeholders (such as leaders of companies and organizations, or executives accountable for a specific business unit) are able to know with full confidence, in real-time, the status of each of the received communications. This status can show, for example, whether some of the received voicemail messages, text or multimedia messages or live chat messages have not yet been responded to, or if some of the submitted forms or uploaded files have not yet been reviewed and processed. This enables responsible stakeholders to help avoid problems with responsiveness, which in turn can help avoid encountering client, customer, prospect or partner satisfaction issues, and help avoid negatively impacting the company's or organization's reputation, image or standing.

The system and method automates adding new records into the organization's WfM System each time a new tangible communication is received that requires a certain action or response, such as a new voicemail, text or multimedia message from a client, or a new live chat from a prospective customer, or when a new form is submitted or a new file is uploaded by a user.

The system and method automates updating status of existing records in the WfM System based on interactions of authorized staff members in an organization's IM System. The IM System can be used for entering comments and observations, or for coordinating plans and approaches on how to respond to the received communication. The IM system can be used for synchronous or asynchronous discussion on the subject or topic included in the received communication, or for documenting an achieved outcome.

This system and method is useful and valuable for use both by a sole practitioner/solo practice or by multi-person or multi-team organizations, since it facilitates tracking and responding to incoming communications through a variety of different mechanisms, devices and web pages, to help ensure that there are no missed opportunities, no un-responded voicemails, no un-responded text, multimedia or live chat messages, and that all received forms and files are reviewed and processed as needed.

Conversely, it allows responsible stakeholders to be aware when live chat messages are not responded to and the visitor ends up disconnecting or leaving the live chat window without receiving a response, or when voicemail or text messages have not been responded to, or when submitted forms or uploaded files have not been reviewed or acted upon.

In another aspect of the present invention, the system and method enables a person or a team of authorized users to leverage an IM System for tracking, managing, collaborating and interacting on live chat, text, multimedia and voicemail messages, as well as notifications received from submitted forms and uploaded files in a way that automatically keeps all messages, comments, updates and exchanges that were entered by the team documented, organized, structured, and easy to access and maintain. The system and method introduces a way to encapsulate all discussions and comments related to a specific incoming communication while the topic is being worked on and store them in an archive as a self-contained record after the work on the topic has been completed. It adds a new capability to an IM System—a Collaboration Space, which is an isolated, self-contained discussion thread that is dedicated to a distinct subject or a single topic or a single interaction with an external party (e.g., one voicemail, one text messaging session, one live chat session, one form received or one file uploaded through a public website). In the invention, a new discussion thread (a new Collaboration Space) is automatically generated for each received voicemail, for each received form, or an uploaded file, or for each new text or live chat or social media messaging session. A Collaboration Space remains open until it's archived by any of the authorized users.

Keeping all the elements of collaboration in one place can make it easier to find, search and locate pertinent information, as opposed to having to deal with a multitude of different point tools, such as a voicemail app, texting or multimedia messaging app, live chat app, etc. Given that an IM System is becoming a more popular way to have many real-time discussions among team members and co-workers—and in many cases it has become the default medium—the system and method takes advantage of the opportunity to capture data entered naturally during the process of team activities into the IM System for purposes of handling and responding to the received communications, while automatically updating the records in the WfM System.

BRIEF DESCRIPTION OF THE DRAWINGS

Figure 8:
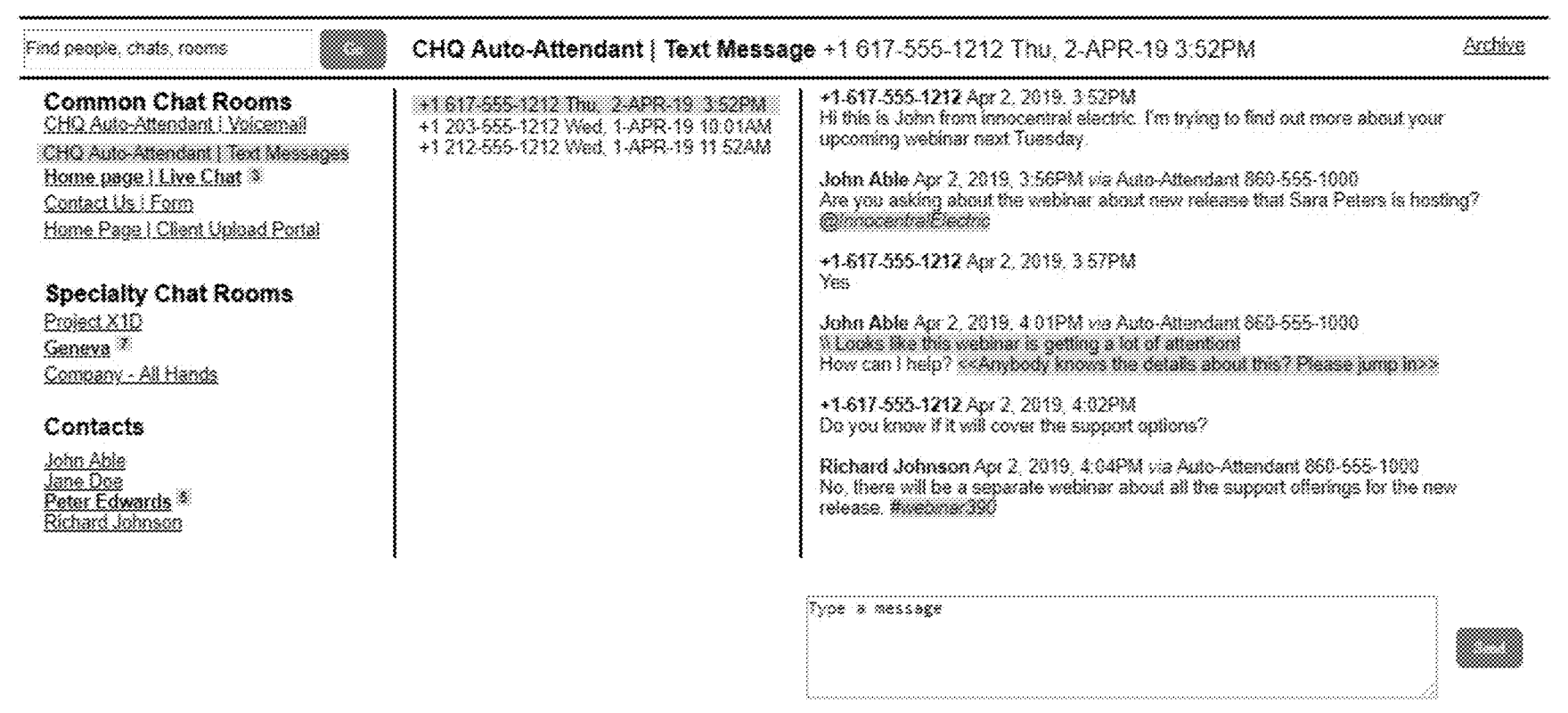

FIG. 8 is a sample screenshot of an exemplary embodiment of a Chat Room titled 'CHQ Auto-Attendant|Text Message' of the IM System that is set up for handling bi-directional communications via text messages through the CHQ auto attendant's phone numbers. Upon receiving a text message, a new Collaboration Space is automatically generated in the IM System with a title '+1 617-555-1212 Thu 2-APR-19 3:52 PM' and a dedicated Chat Window. The first message in the Chat Window is automatically generated with the content of the received text message, the date and time stamp and the phone number used to send the text message. The screenshot shows an illustrative demonstration of the follow up exchange conducted in the Chat Window. Authorized users can use the Chat Window to enter messages to respond to the external parties. The IM System in the present invention also allows authorized users to exchange private comments, comments that can be controlled with a special syntax or can be added by using an on-screen menu. For example, using \\ would mark the rest of the line as a private comment only visible to the members of the Chat Room, but not to external parties; alternatively << . . . >> could be used to make the content within the brackets only visible to the members of Chat Room, but not to external parties. In addition, FIG. 8 illustrates how authorized users can add Private Tags (#webinar390) or how they can assign a Private Contact ID (@InnocentralElectric) to the content of the Chat Window. The assigned Private Contact IDs and user-defined Tags are also only visible to the members of the Chat Room, and not visible to external parties.

Figure 9:
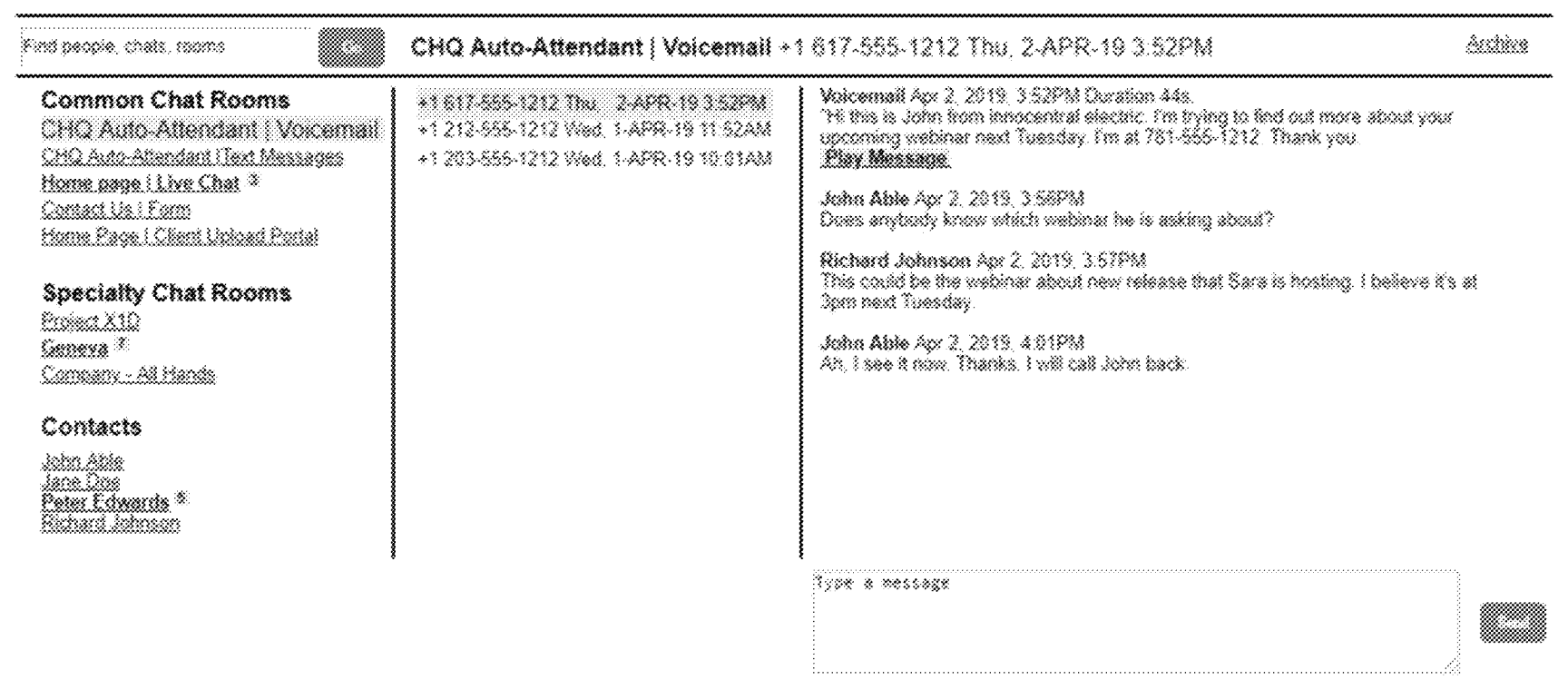

FIG. 9 is a sample screenshot of an exemplary embodiment of a Chat Room titled 'CHQ Auto-Attendant|Voicemail' of the IM System that is set up for handling voicemail messages (uni-directional communications) received through the CHQ auto attendant's phone numbers. Upon receiving a voicemail message, a new Collaboration Space is automatically created with a title '+1 617-555-1212 Thu, 2-APR-19 3:52 PM)' along with a dedicated Chat Window. The first message in the Chat Window is automatically generated with the information about received voicemail message, such as the transcription of voicemail message, the date and time stamp, the phone number used to leave the voicemail message, duration of the voicemail and a link to listen to the audio of the voicemail message. The Chat Window can be used to document observations, comments and outcome of responding to a voicemail, or for internal discussion (e.g., to determine what needs to be done or how to respond, to coordinate action items, etc.).

FIG. 10 is a sample screenshot of an exemplary embodiment of a Chat Room titled 'Home Page|Live Chat' of the IM System that is set up for exchanging live chat messages (another type of bi-directional communication) with visitors of the home webpage. Upon receiving a live chat message, a new Collaboration Space is automatically created with a title 'Visitor 0001 (IP:71.80.98.11, Avon, Conn.) Jun. 6, 2018, 4:04 PM' and with a dedicated Chat Window. The first message in the Chat Window is automatically generated with the content of the message received through the live chat widget, the date and time stamp and the information about the visitor and their device, such as the IP address of the device used to send the live chat message, the OS used on their device, and the device type (e.g., mobile vs. desktop). The screenshot shows an illustrative demonstration of the follow up exchange conducted within the Chat Window. Authorized users can use the Chat Window to enter messages to respond to the external parties. The IM System in the present invention also allows authorized users to exchange private comments, comments that can be controlled with a special syntax, or by using an on-screen menu. For example, using \\ would mark the rest of the line as a private comment only visible to the members of Chat Room. In addition, similarly to a FIG. 8. an authorized can use an alternative syntax << . . . >> to make the content within the brackets only visible to the members of Chat Room, but not to external parties, or they can assign tags (#tag_name) or Contact IDs (@Contact_name_ID) to the content of the Chat Room. The assigned Contact IDs and user-defined tags are also only visible to the members of the Chat Room, and not visible to external parties.

Figure 11:
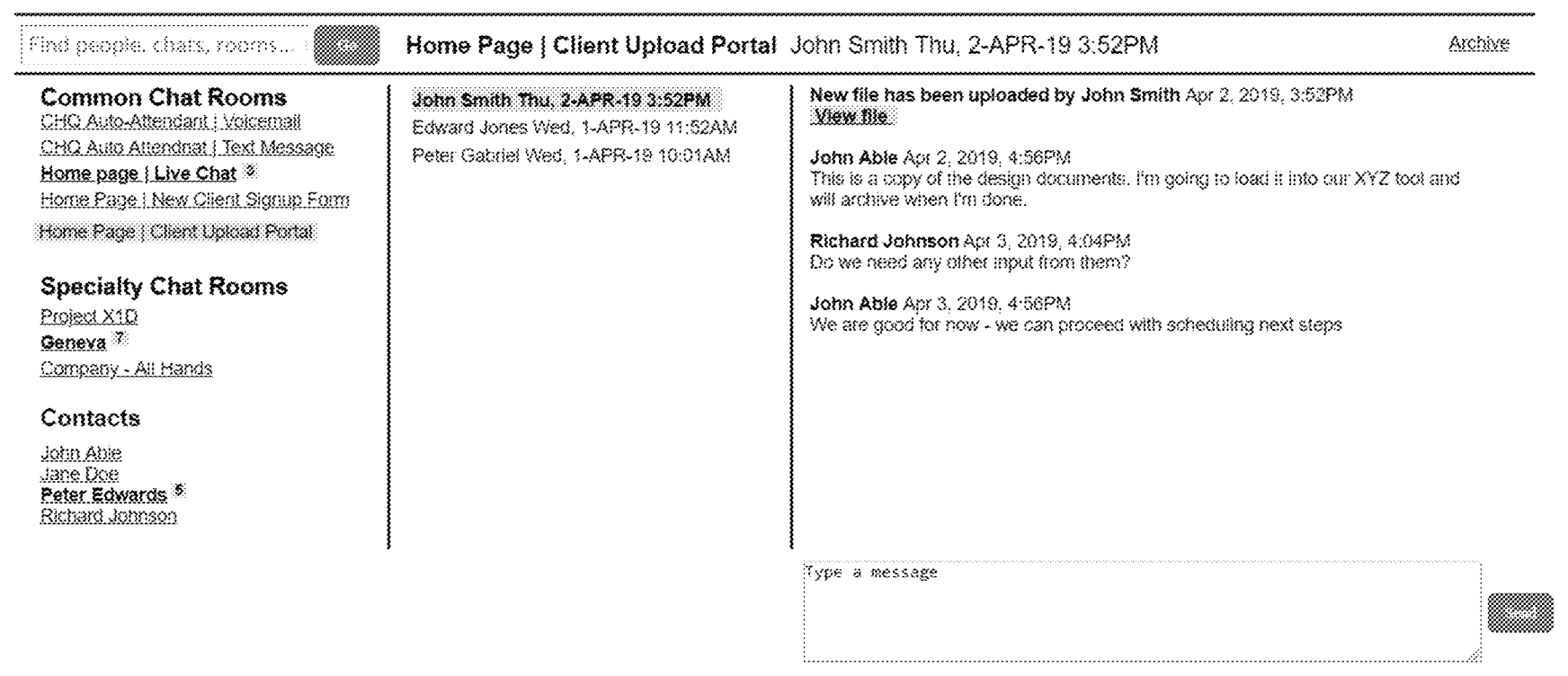

FIG. 11 is a sample screenshot of an exemplary embodiment of a Chat Room titled 'Home Page|Client Upload Portal' of the IM System that is created for handling notifications about files uploaded through a portal on the home webpage (uni-directional communications). Upon receiving a new notification, a new Collaboration Space is automatically created with a title 'John Smith Thu, 2-APR-19 3:52 PM' and a dedicated Chat Window. The first message in the Chat Window is automatically generated with the information about received file, such as the link to access the uploaded file, date and time stamp, and the sender. The Chat Window can be used to document observations, comments and outcome of reviewing the file, or for internal discussion (e.g., to determine what needs to be done to process the file or to coordinate action items, etc.).

FIG. 13 is a sample screenshot of an exemplary embodiment of a Chat Window titled 'By Client|John Smith+1 617-555-1212' of the IM System that is automatically generated to view all Collaboration Spaces for a specific Contact ID. The Chat Window shows an example of messages automatically generated when a new text message, a new voicemail, a new form and a new file were received from the client and messages that were exchanged with the client and between the team members. The read-only Chat Window shows all interactions that occurred between the client and authorized users in chronological order across different communication mechanisms.

FIG. 14 is a sample screenshot of an exemplary embodiment of a detailed view of the WfM System. The detailed view shows each of the WfM records in a portrait (vertical) view, one or more records at a time. A new WfM record is automatically generated when a new communication is received from an external party. The 'Initiated' field shows the date and time stamp when a new communication was received. The 'Visitor' field shows the information about who initiated that communication (for example, it could be a phone number for a received voicemail or text message, an IP address for a message received through a live chat, an email address for a form received or file uploaded through the website). The 'Type' field shows the type of communication that was received, e.g., Voicemail, Text Message, Live Chat, Form, Uploaded File, etc. The 'Communication Mechanism' field shows the specific communication mechanism that was used (e.g., a specific auto attendant, or a specific live chat widget, or a specific form, or a specific upload portal). The 'Contact ID' field shows Contact IDs of the external parties assigned by an authorized user in the corresponding Chat Window. The 'Tags' field shows Private user-defined Tags added in the corresponding Chat Window. The 'Opened' field shows the date and time stamp when the automatically generated message was first viewed by an authorized user. The 'Opened by' field shows the ID of the user who was first to view the automatically generated message in the corresponding Chat Window in the IM System. The field 'Last Action' shows the date and time stamp of when the last time an authorized user entered any comment or message in the corresponding Chat Window. The field 'Last Action by' shows the ID of the user that entered the last comment or message in the corresponding Chat Window in the IM System. The field 'Last Status' shows the last Status Code that was entered by an authorized user in the corresponding Chat Window in the IM System. The field 'Status Updated' shows the data and time stamp, when the Status Code was entered. The field 'Status Updated by' shows the ID of the authorized user who entered the Status Code. The field 'Completed' shows the date and time stamp when the Collaboration Space was archived. The field 'Completed by' shows the ID of the user that archived the Collaboration Space. The record is automatically updated upon receiving a communication and based on the actions incurred in the Chat Window of the corresponding Collaborative Space. The links in the 'Type' field allow authorized users to open the Chat Window of the corresponding Collaboration Space that contains the message that was automatically generated when the communication was received with all the details of communication and follow-up messages. The link in the 'Contact ID' field allows authorized users to open an aggregated view of all Collaboration Spaces that were automatically created for that specific Contact ID—to be able to view all the communications received from that contact, and all the subsequent discussions that occurred internally or between authorized users and the contact. The link in the 'Tag' field allows authorized users to open an aggregated view of all Collaboration Spaces that were assigned to that user-defined tag in order to view all the communications and all the subsequent discussions that occurred internally or between authorized users and external parties related to that tag.

FIG. 15 is a sample screenshot of an exemplary embodiment of a summary view of the WfM System. The summary view shows the WfM System records at a glance in a landscape view and can be used as a primary dashboard to view the status on how received communications are being handled. The 'Initiated' field shows the date and time stamp when a new communication was received. The 'Visitor' field shows the information about who initiated that communication (for example, it could be a phone number for a received voicemail or text message, an IP address for a message received through a live chat, an email address for a form received or file uploaded through the website, or information about the target of a new outbound communication if the communication was initiated by an authorized user/Chat Room member). The 'Type' field shows the type of communication that was received, e.g., Voicemail, Text Message, Live Chat, Form, Uploaded File, etc. The 'Mechanism' field shows the specific instance of the communication mechanism that was used (e.g., a specific auto attendant, or specific live chat widget, or a specific form, or a specific upload portal page). The 'Contact ID' field shows Private Contact IDs of the external parties assigned by an authorized user in the corresponding Chat Window. The 'Tags' field shows internal Private user-defined Tags assigned in the corresponding Chat Window. The field 'Status' shows the last Private Status Code that was entered by an authorized user in the corresponding Chat Window in the IM System, or it can show 'Opened' as an automatic status when the first automatically generated message in the Chat Window of the corresponding Collaboration Space was opened by an authorized user for the first time, or it can show 'Completed' as an automatic status when the Chat Window of the corresponding Collaboration Space was originally archived by an authorized user. The field 'Status Updated' shows the data and time stamp, when the Status Code was entered, or if the status is 'Opened' it shows the date and time stamp when the authorized user opened the first automatically generated message in the Chat Window of the corresponding Collaboration Space for the first time, or if the status 'Complete' it shows the date and time stamp when the authorized user originally archived the Chat Window of the corresponding Collaboration Space. For Chat Rooms that are configured to auto-archive (e.g., upon the visitor leaving the live chat session before getting a response), the WfM record can also be updated with an automatic status 'Timed-out'. The field 'Status Updated by' shows the ID of the authorized user who entered the Status Code, or if the status is 'Opened' it shows the ID of the authorized user that opened the first automatically generated message in the Chat Window of the corresponding Collaboration Space for the first time, or if the status 'Complete' it shows the ID of the authorized user that originally archived the Chat Window of the corresponding Collaboration Space. The WfM records are automatically updated upon receiving a communication and based on the actions incurred in a Chat Window of the corresponding Collaborative Space. The links in the 'Type' field allows to open the Chat Window of the corresponding Collaboration Space that contains the message that was automatically generated when the communication was received, and all the content added after that. The link in the 'Contact ID' field allows to open an aggregated view of all Collaboration Spaces that were automatically created for that specific Private Contact ID—to view all the communications received from that contact, and all the subsequent discussions that occurred internally or between authorized users and that contact. The link in the 'Tag' field allows to open an aggregated view of all Collaboration Spaces that were assigned to that Private user-defined Tag—to view all the communications and all the subsequent discussions that occurred between authorized users and/or with external parties where that tag was assigned.

DETAILED DESCRIPTION OF THE INVENTION

The following detailed description is one of the best currently contemplated modes of carrying out exemplary embodiments of the invention. The description is not to be taken in a limiting sense but is made merely for the purpose of illustrating the general principles of the present invention.

Broadly, an embodiment of the present invention provides a system and method for automating workflow management and tracking of voicemail, text and multimedia messages, social media messages, live chats, forms, uploaded files, other types of communications, and responses to them.

In addition, the present invention provides a system and method for interactive private and public multi-user collaboration on communications received from external parties, such as voicemails, text and multimedia messages, fax communications, social media messages, live chat messages, online forms and files uploaded through websites.

The present invention may include at least one computer with a user interface. The computer may include at least one processing unit and a form of memory including, but not limited to, a desktop, laptop, and smart device, such as a tablet and smartphone. The computer includes a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the Internet, extranet, intranet, host server, Internet cloud and the like.

Figure 1:
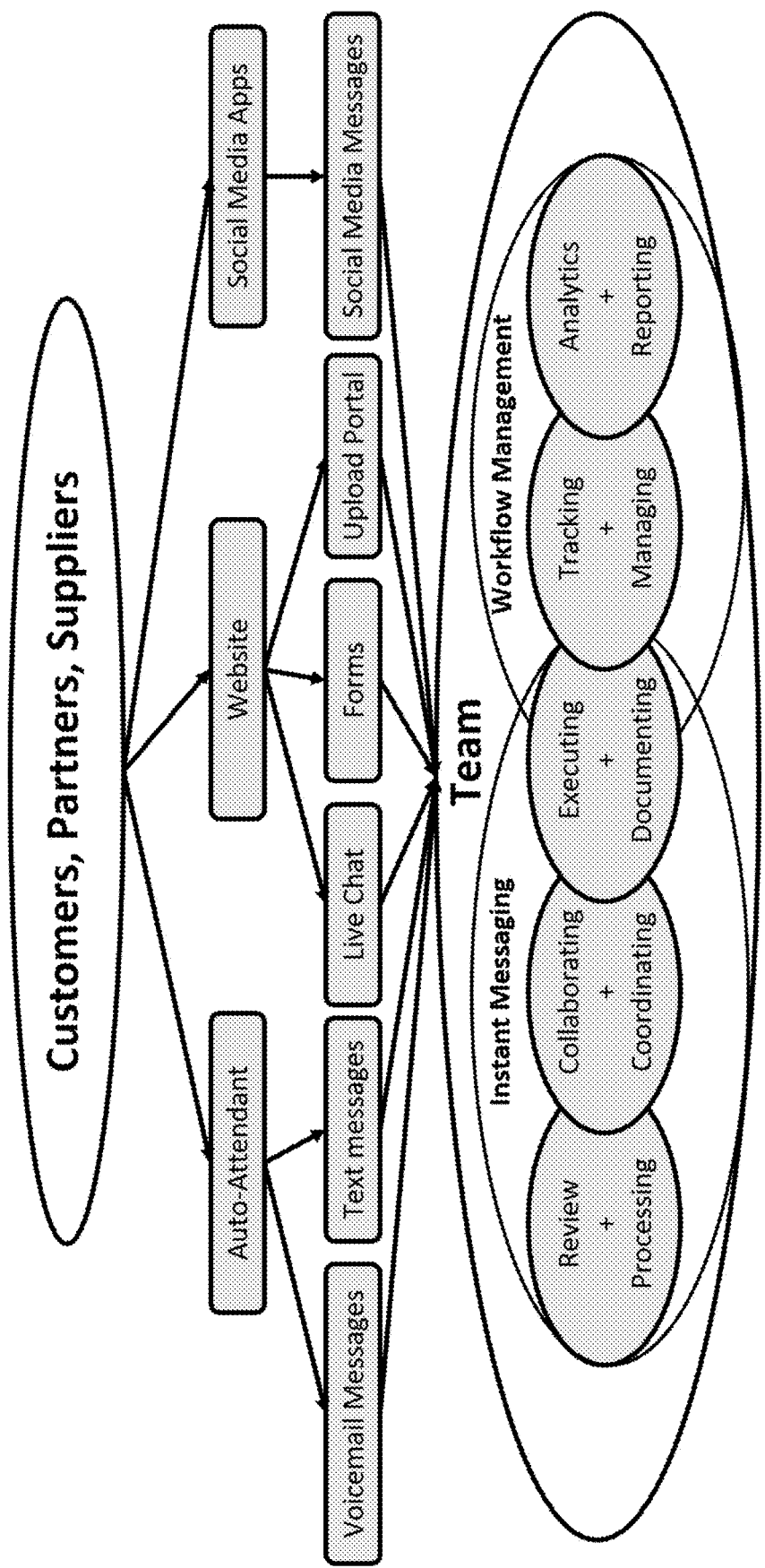
FIG. 1 is a chart of an exemplary embodiment of how incoming communications from external parties flow to the organization's IM System and subsequently to the organization's WfM System. An external party could be a client, customer, partner, supplier, vendor, prospective client or other types of persons or entities. An external party can use different types of mechanisms to communicate or share their data with an organization (communication mechanisms): they can contact an organization's representative by making a telephone call and leaving a voicemail, by sending a text message, by sending a live chat message, or filling out and submitting an online form, or uploading a file through the organization's website, by contacting the organization through a social media service or through other means. Members of the organization, who are authorized to access incoming communications, can review and process what was received, they can collaborate with other team members, coordinate their activities or document their findings, results or observations and execute tasks in the process of handling an incoming communication. The invention simplifies handling these activities by integrating communication mechanisms with the organization's IM System, taking advantage of the fact that instant messaging has become an essential part of the daily workflow for many companies. Authorized users are able to review incoming communications directly in their IM System. They can use the IM System to document necessary conclusions, decisions, observations, or outcomes regarding the received communication. If any coordination or collaboration is required to handle the received communication, they can use the IM System to discuss and plan their actions with teammates. The invention includes unique integration of the IM System with the organization's WfM System. When a new communication is received, in addition to automatically generating a new message with the details of the communication, a new record in the WfM System is automatically added. As authorized users use the IM System while trying to address or handle an incoming communication (e.g., received voicemail, text message, live chat message, online form, uploaded file, or social media message etc.) the invention automatically updates the corresponding WfM System record that was created for the received communication. The WfM System enables a company to track the status of each of the received communications, to oversee and manage the workflow processes related to handling incoming communications, to identify insights, trends, gather analytics data based on the records generated and updated in the WfM System over the course of processing and handling incoming communications, and generate reports for authorized users.
Figure 2:
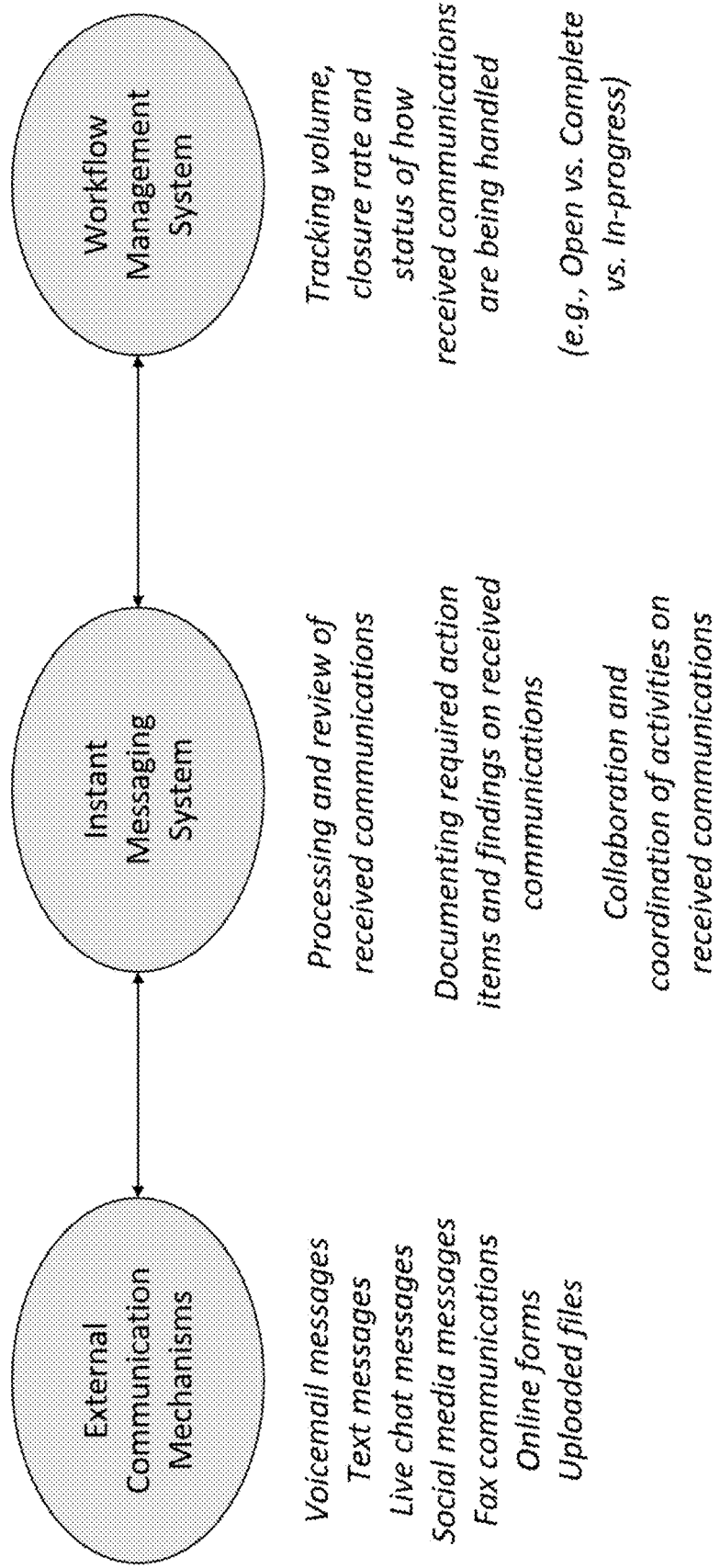
FIG. 2 is an embodiment of the relationship between key components of the present invention: external communication mechanisms are directly integrated with the organization's IM System and the IM System is directly integrated with the organization's WfM System. In the present invention, each of the received communications from external parties automatically generates a message in the IM System that notifies authorized users (A) to review the content of the received communication, (B) to document their findings, observations, comments, as well as (C) to collaborate and coordinate their actions with other authorized team members while trying to address or handle the received communication. In the present invention, each of the received communications from external parties also automatically generates a record in the WfM System. User actions within the IM System automatically update the corresponding record in the WfM System. The WfM System allows authorized users to track the status of work efforts related to handling incoming communications, identify trends and potentially overlooked communications that can require an action.
Figure 3:
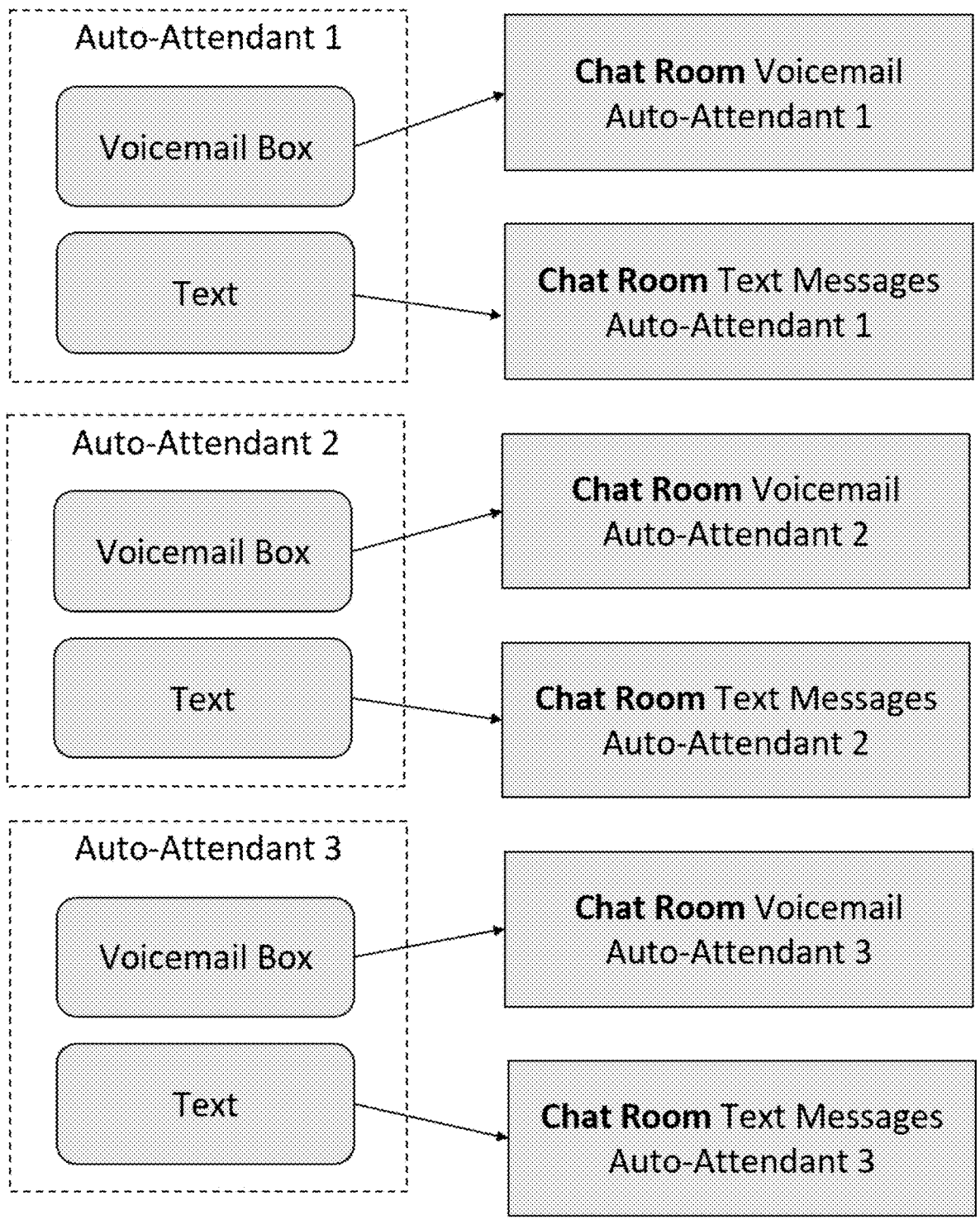
FIG. 3 illustrates a sample scenario of how a separate Chat Room is created in the IM System for each instance of a communication mechanism when a new instance of a communication mechanism is established. For example, when a new auto attendant (an automated attendant that allows callers to be automatically transferred to an extension without the intervention of an operator/receptionist) is initially implemented for voice and text messages, two Chat Rooms in the IM System must be set up and configured—one for Voicemails and one for Text Messages. The assumption here is each auto attendant can be set up with multiple phone numbers and a single voicemail box and single (primary) texting service. There is a one-to-one relationship between each instance of communication mechanisms and a Chat Room in the IM System. If three different auto attendants are set up to receive voice calls and voicemails, three corresponding Chat Rooms need to be created in the IM System, ideally with titles that can help uniquely identify the corresponding communication mechanism. Similarly, when a new live chat widget is established on the organization's website, a new Chat Room needs to be set up in the IM System to support live chat sessions. Each instance of communication mechanism needs to be connected and integrated with the corresponding Chat Room in the IM System, so that content can flow between the communication mechanism and the Chat Room and vice versa.
Figure 4:
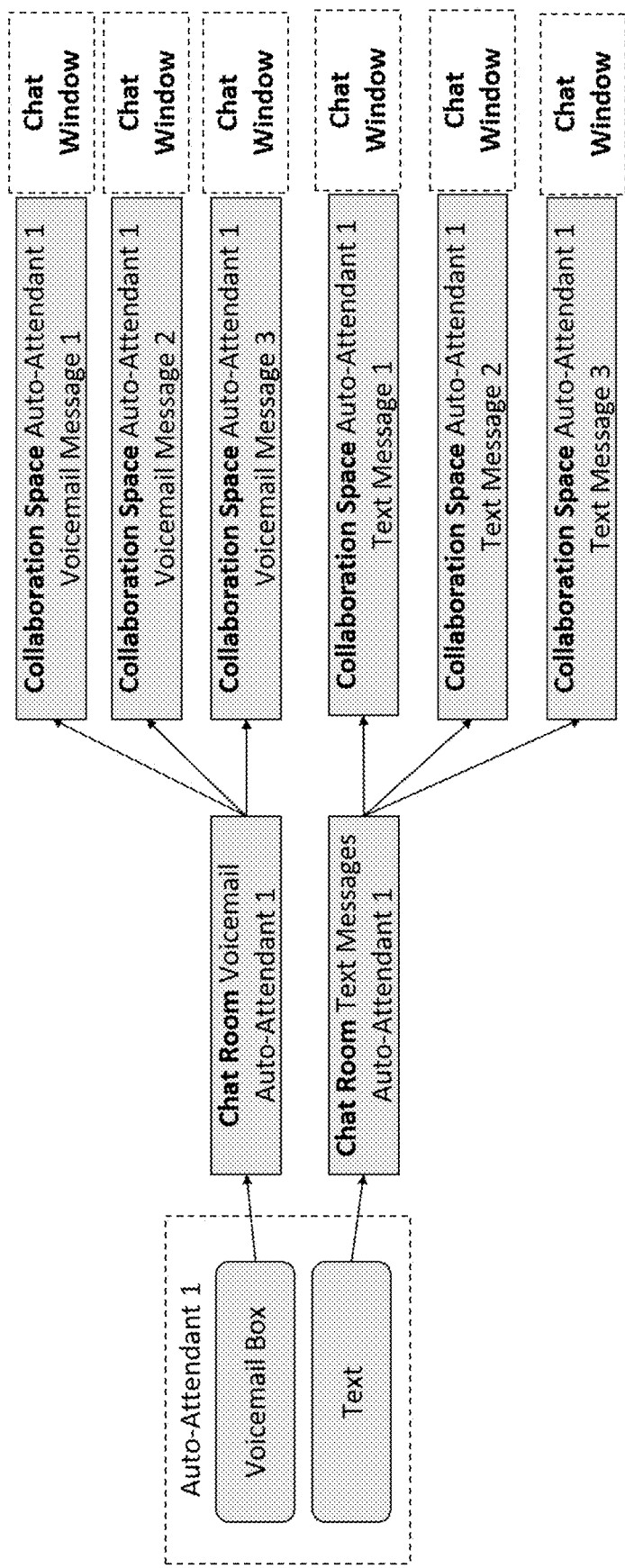
FIG. 4 illustrates a sample scenario of how a separate Collaboration Space is automatically generated when a new communication is received in the Chat Room connected to the communication mechanism used to receive that communication. If a new voicemail is received through Auto Attendant 1, a new Collaboration Space will be created for that voicemail in the Chat Room set up for Auto Attendant 1's voice number. If another voicemail is received through the same Auto Attendant 1's voice number, another Collaboration Space will be automatically created in the same Chat Room. A Chat Room can contain multiple Collaboration Spaces, one Collaboration Space for each instance of received communication (either bi-directional or one-direction communication). Each Collaboration Space contains one Chat Window.
Figure 5:
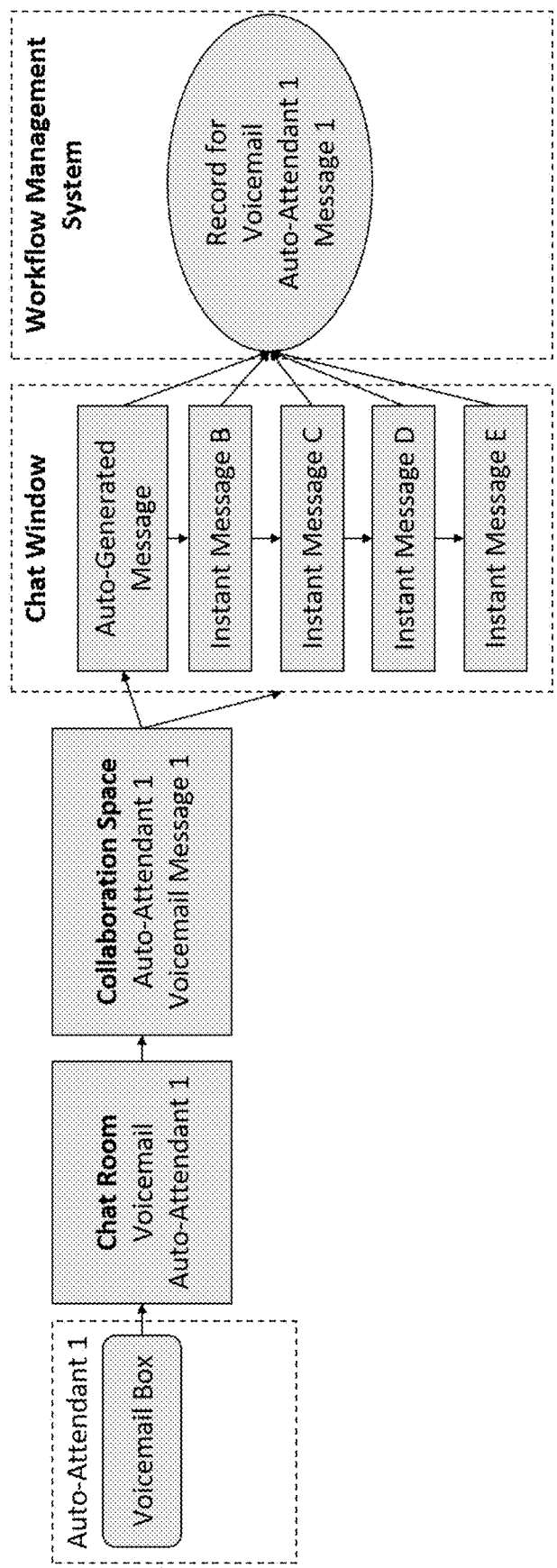
FIG. 5 illustrates a sample scenario of how a record is automatically created in the WfM System when a new communication is received, and how that record is automatically updated while communication is being handled. When a new communication is received, a new Collaboration Space is automatically generated and the first message in that Collaboration Space's Chat Window is automatically posted with the content of the received communication. E.g., if a new voicemail is received, the first message in the Collaboration Space's Chat Window will include the information about the voicemail (e.g., caller's phone number, transcription of the content of the voicemail, a link to listen to the audio of the voicemail, the duration of the voicemail, etc.). When a new Collaboration Space and its first message are generated, a new record in the organization's WfM System is automatically created. The WfM record is automatically populated with the information about the received communication, including the link to the Chat Window of the corresponding Collaboration Space. Authorized users can use the Chat Window to enter their comments, observations or exchange messages with other authorized team members. Each message entered in the Chat Window automatically updates the corresponding record in the WfM System (such as date and time stamp of the last message, and user ID of the person who entered the last message).
Figure 6:
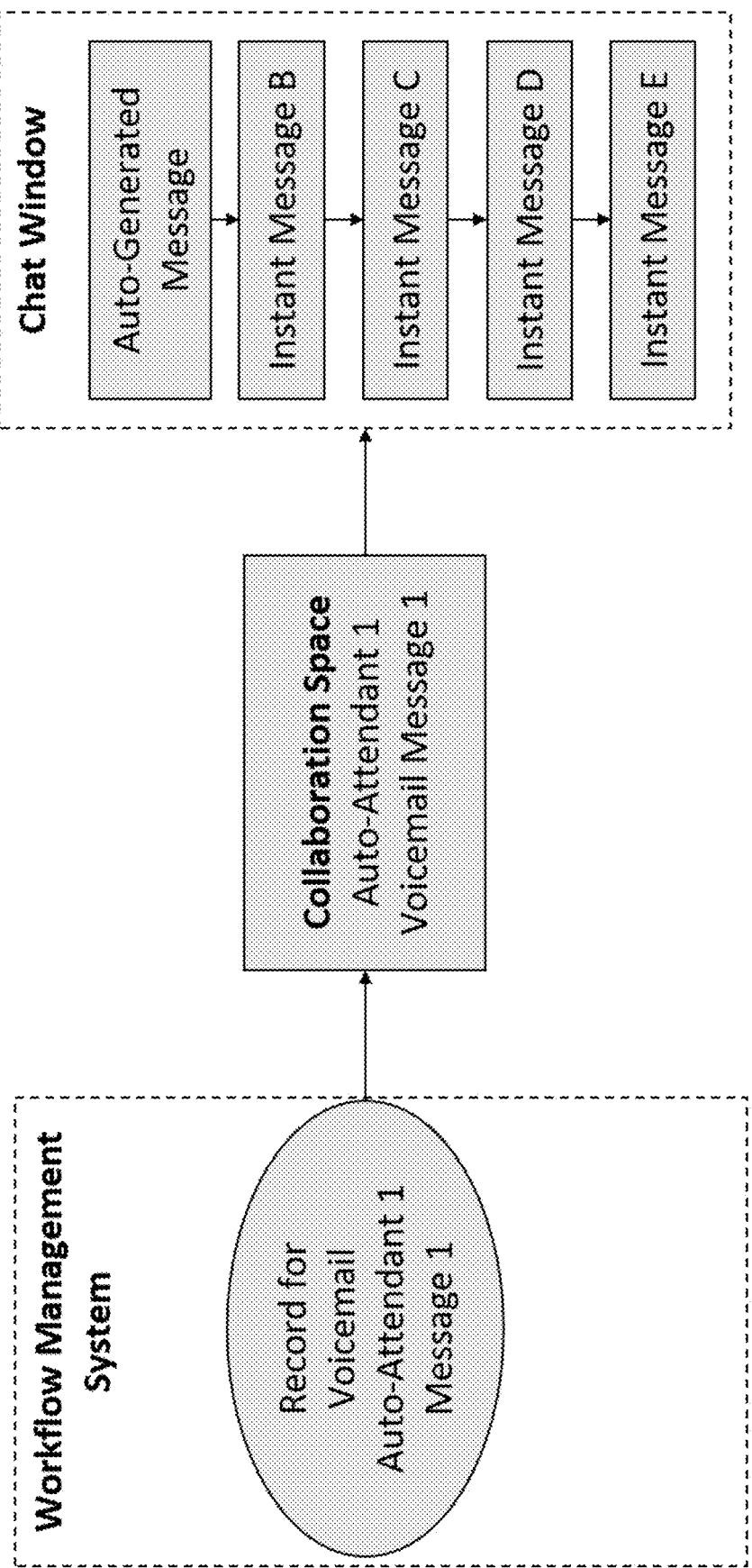
FIG. 6 illustrates how an authorized user can open a corresponding Collaboration Space and its Chat Window directly from a record in the WfM System to view all instant messages in that Chat Window.
Figure 7:
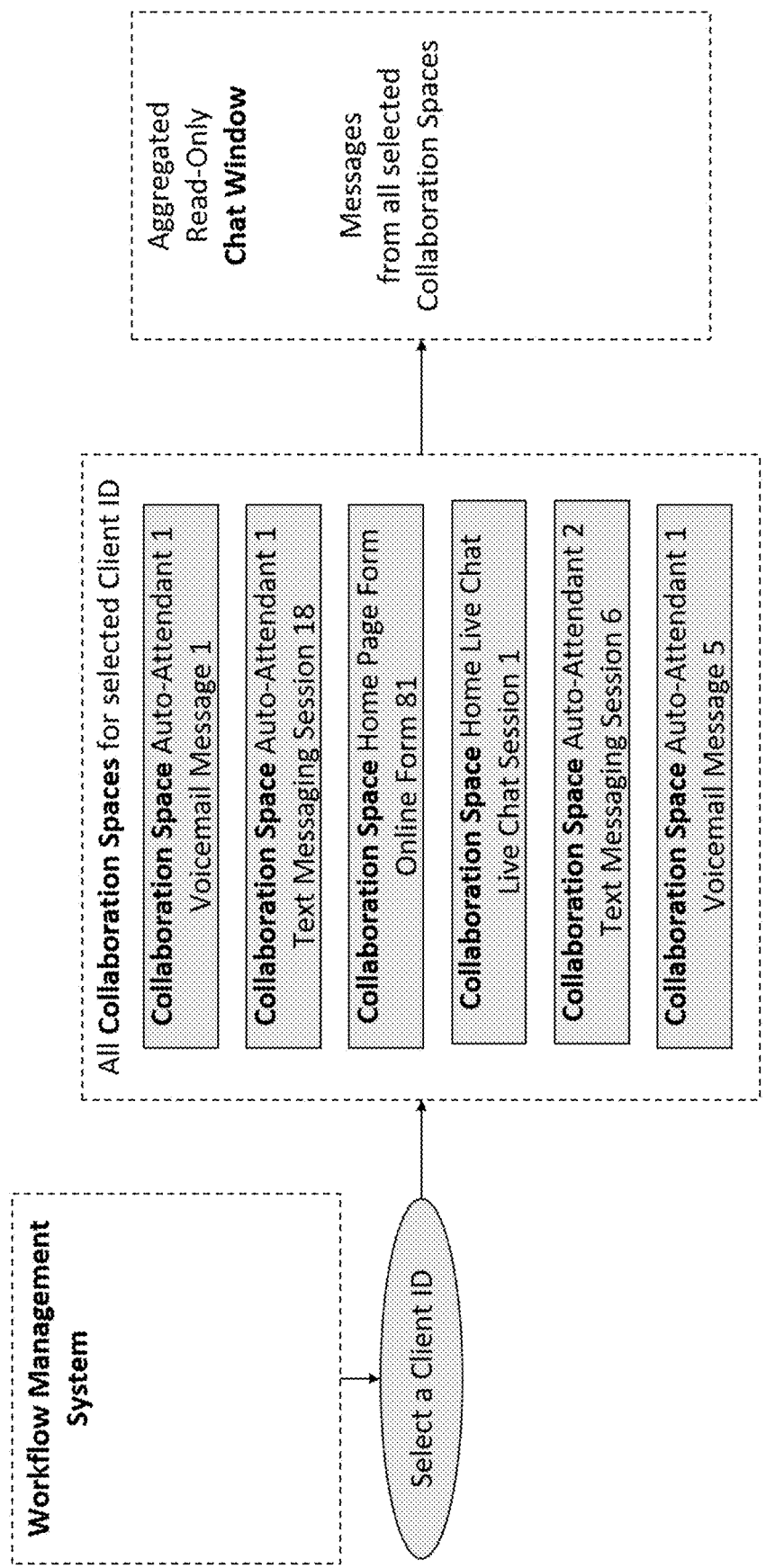
FIG. 7 illustrates how an authorized user can open an aggregated, seamless view of all Collaboration Spaces that were created for a specific External Party (or Contact ID) regardless of the type of the received communication. This read-only Chat Window will aggregate the content from each of the applicable Collaboration Spaces. The messages can be displayed in chronological or reverse-chronological order, or grouped by type (e.g., messages for all text sessions, all live chat sessions, all voicemails, all forms, all uploaded files etc.). Similarly, an aggregated view can be generated and displayed for Collaboration Spaces that match a different set of criteria, such as all Collaboration Spaces that include one or more tags.
Figure 12:
FIG. 12 is a sample screenshot of an exemplary embodiment of a Chat Room titled 'Home Page|New Client Signup Form' of the IM System that is created for handling notifications about submissions received through the online New Client Signup Form. Upon receiving a new notification, a new Collaboration Space is automatically created with a title of 'John Smith Thu, 2-APR-19 3:52 PM' and a dedicated Chat Window. The first message in the Chat Window is automatically generated with the information about received form, such as the link to view the form received through the website, the date and time stamp, and the sender. The Chat Window can be used to document observations, comments and outcome of reviewing the received form, or for internal discussion (e.g., to determine what needs to be done to process the form or to coordinate action items, etc.).
Figure 16:
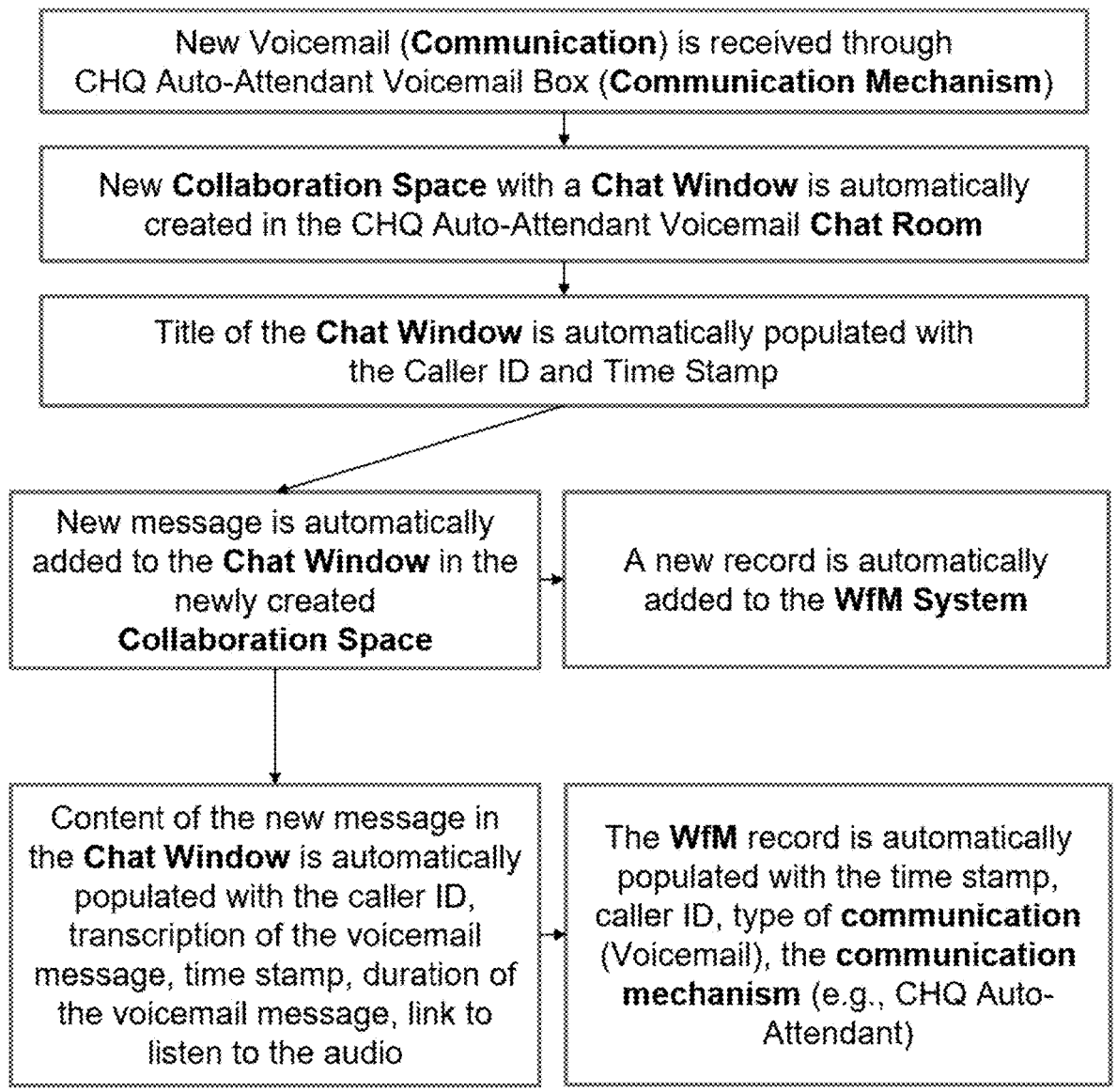
FIG. 16 is a sample flowchart of an exemplary embodiment of a process when a new voicemail message is received. A new voicemail message is an example of a uni-directional communication. The CHQ auto attendant's voicemail box is an example of an instance of a Communication Mechanism. The type of Communication is 'Voicemail'. When a new voicemail message is received, a new Collaboration Space is opened in the Chat Room dedicated to the CHQ auto attendant voicemail communication mechanism. The new Collaboration Space and its Chat Window are dedicated to the received voicemail message and discussions around it. The title of the Chat Window is automatically populated with the Caller ID of the contact who left a voicemail message, and the date and time stamp of when the voicemail message was received. A first new message is automatically added to the Chat Window in the newly created Collaboration Space and automatically populated with the Caller ID, transcription of the voicemail message, the date and time stamp when the voicemail was received, the duration of the voicemail message, and a link to listen to the voicemail message. When a new message is added to the Chat Window, a new record in the WfM System is automatically created and populated with the date and time stamp, caller ID, type of communication (Voicemail), and the communication mechanism (CHQ auto attendant voicemail box).
Figure 17:
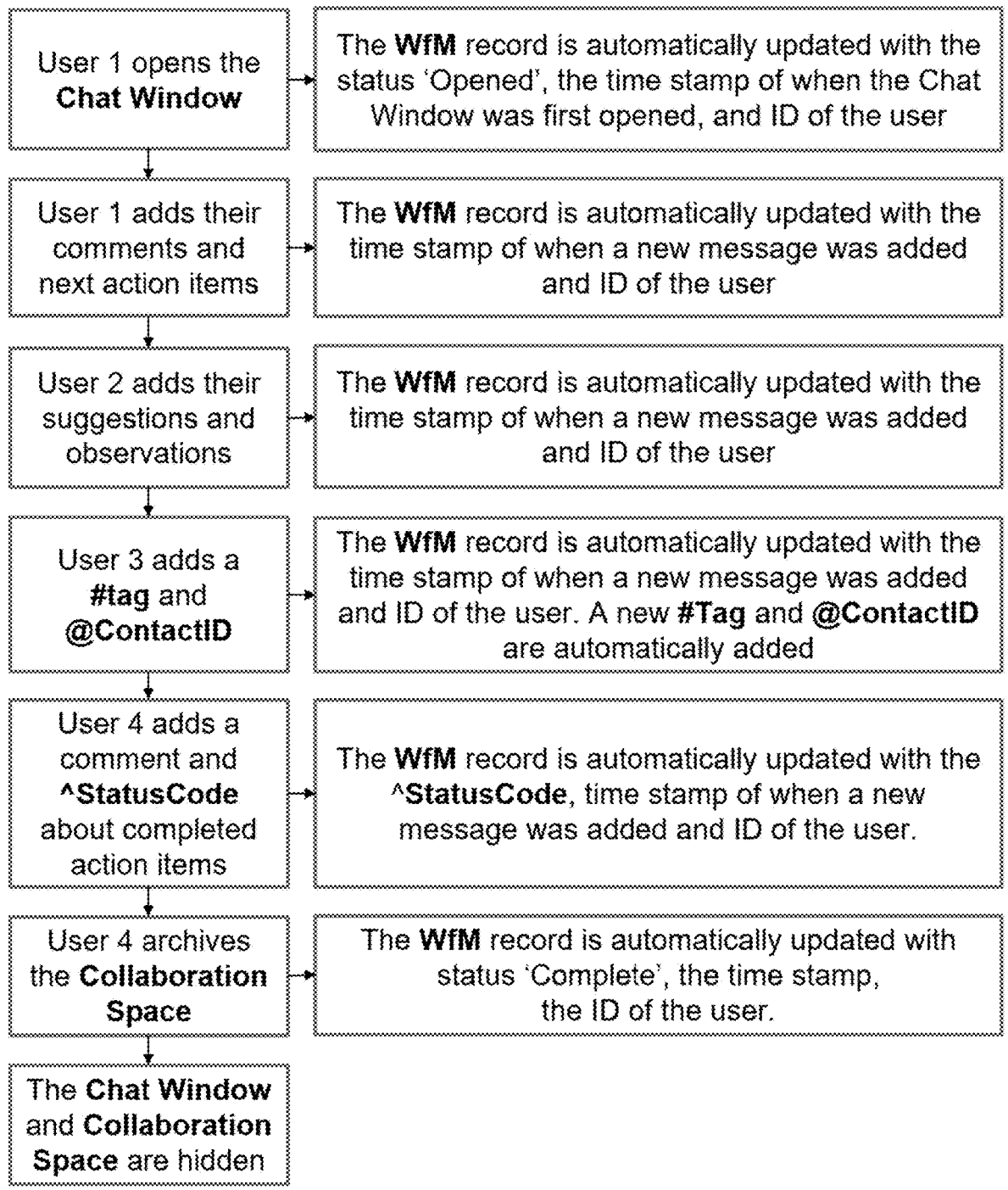
FIG. 17 is a sample flowchart of an exemplary embodiment of a process when authorized users access a Chat Window created for a received voicemail message. When the Chat Window is opened for the first time, the corresponding WfM record is automatically updated with the status 'Opened', the date and time stamp and User 1's ID (who first opened it). User 1 reviews the voicemail transcription, listens to the voicemail message (if applicable) and then documents their comments and action items to address the content of the voicemail as needed. Each time User 1 enters a new message in the Chat Window, the WfM record is automatically updated with the current date and time stamp and User 1's ID. User 2 reviews the voicemail transcription as well as comments and actions items documented by User 1 and enters their observations and suggestions that could help the team with the next steps. Each time User 2 enters a new message in the Chat Window, the corresponding WfM record is automatically updated with the date and time stamp and User 2's ID. User 3 reviews the content of the voicemail and previous messages entered by User 1 and User 2 and adds a Private Tag (#tag) that can help categorize this chat and/or the voicemail received in a meaningful way for the team. When a Private Tag (#tag) is entered in the Chat Window, it is automatically added to the corresponding WfM record. User 3 also adds a Private Contact ID (@Contact ID) that identifies the external party related to the voicemail message. When a Private Contact ID (@Contact ID) is entered in the Chat Window, it is automatically added to the corresponding WfM record. The WfM record is automatically updated with the date and time stamp of when the Private Tag and Private Contact ID were added and User 3's ID. After User 4 reviews the content of the voicemail and previous messages entered by User 1, User 2 and User 3, and executes needed action items, User 4 types the summary of what was done and completed, and enters a Private Status Code (e.g., ^Client_is_all_set). The Private Status Code is automatically added to the WfM record with User4's ID, and the date and time stamp of when the Private Status code was entered in the Chat Window. User 4 archives the Collaboration Space, and it is removed (hidden) along with its Chat Window from the Chat Room. The corresponding WfM record is automatically updated with the status 'Complete', date and time stamp of when the Collaboration Space was archived and User 4's ID
Figure 18:
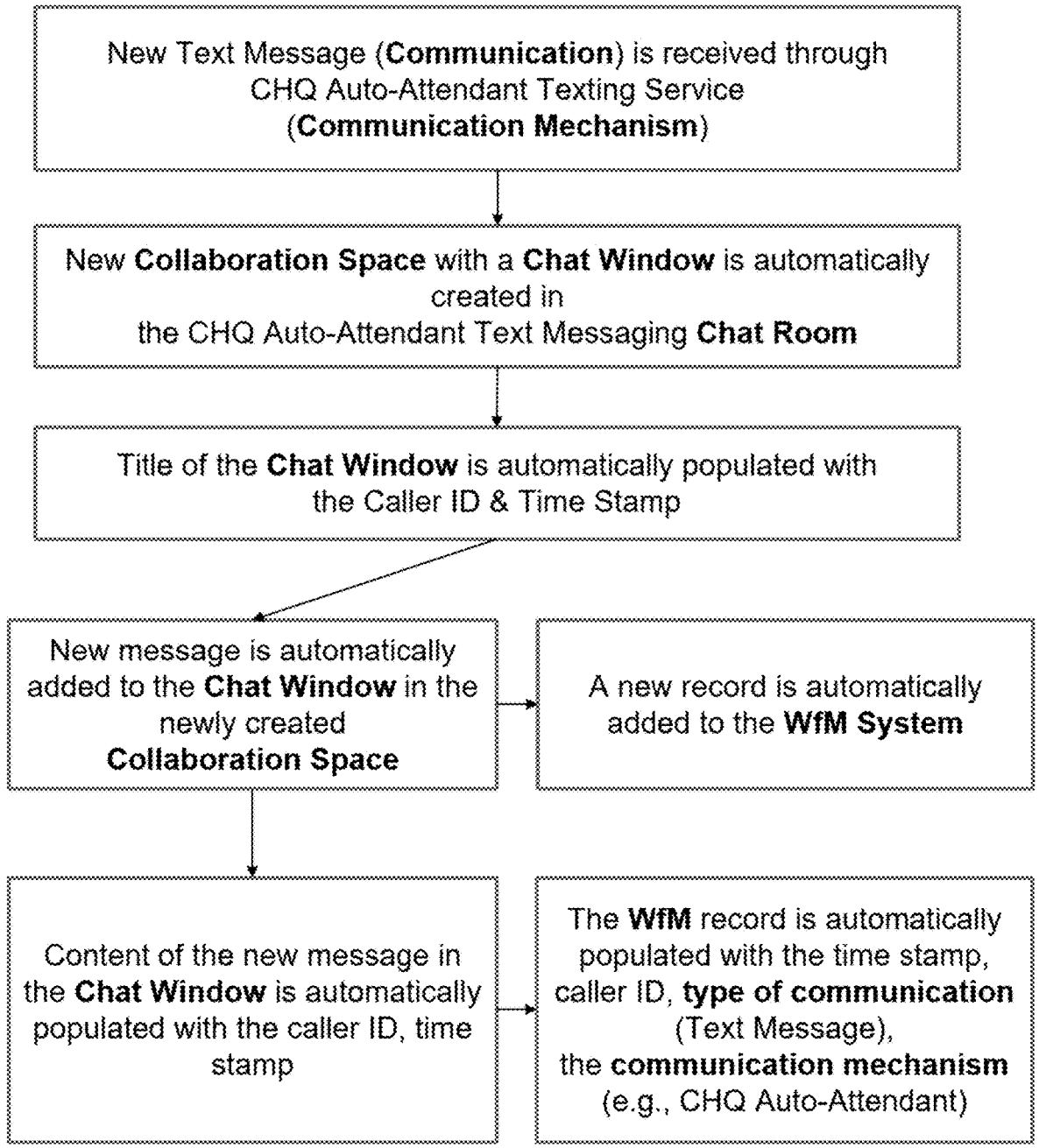
FIG. 18 is a sample flowchart of an exemplary embodiment of a process when a new text message is received. A new text message is an example of a bi-directional communication. The CHQ auto attendant's text messaging service is an example of an instance of a Communication Mechanism. The type of Communication is 'Text Message'. When a new text messaging session is started, a new Collaboration Space is opened in the Chat Room dedicated to the CHQ auto attendant text messaging communication mechanism. The new Collaboration Space and its Chat Window are dedicated to the text messaging session as well as discussions around it. The title of the Chat Window is automatically populated with the Caller ID of the contact who sent the text message, and the date and time stamp of when the text message was received. A new entry is automatically added to the Chat Window in the newly created Collaboration Space and automatically populated with the phone numbers of the sender and contacts copied on the text message, the content of the received text message, and the date and time stamp when the text message was received. When a new message is added to the Chat Window a new record in the WfM system is automatically created and populated with the date and time stamp, phone number of the sender, type of communication (Text Message), the communication mechanism (CHQ auto attendant text messaging service).
Figure 19:
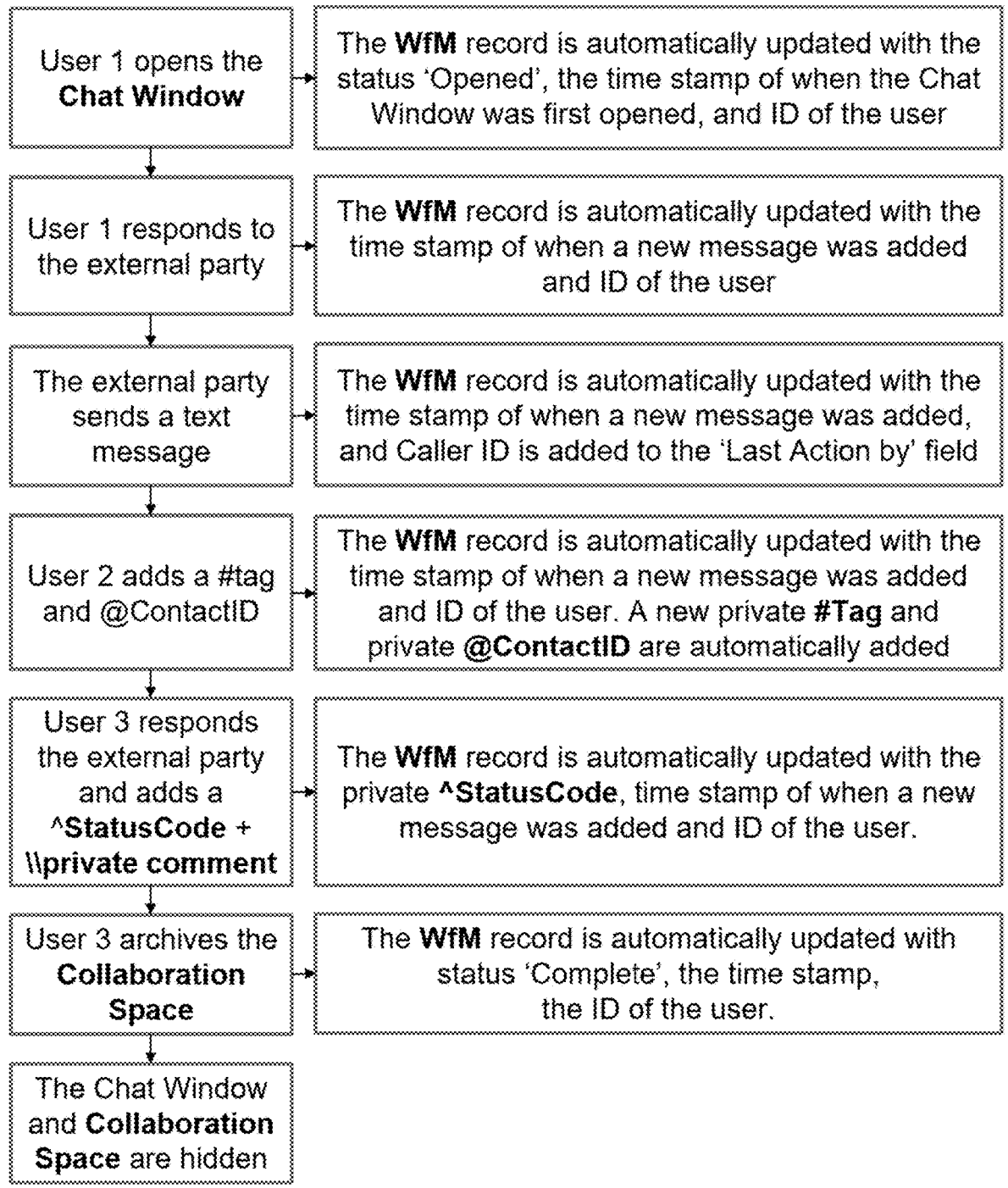
FIG. 19 is a sample flowchart of an exemplary embodiment of a process when authorized users access a Chat Window created for the received text message. When the Chat Window is opened for the first time, the corresponding WfM record is automatically updated with the status 'Opened', the date and time stamp and User 1's ID (who first opened it). User 1 reviews the received text message, types and sends a response to the external party. Each time a new message is sent in the Chat Window, the corresponding WfM record is automatically updated with the date and time stamp, and User 1's ID. The external party sends back another text message. Each time a new message is received in the Chat Window the corresponding WfM record is automatically updated with the date and time stamp and Caller ID of the sender. User 2 reviews the text messages exchanged between the external party and User 1 and adds a Private Tag (#tag) that can help categorize the text messaging session in a meaningful way for the team. In addition, User 2 adds a Private Contact ID (@Contact ID) that is identified with the external party related to the text messages. The Private Tag and Private Contact ID are only visible to the members of the Chat Room (authorized users) and not visible to the external parties. The Private Tag and the Private Contact ID are automatically added to the corresponding WfM record. The WfM record is automatically updated with the date and time stamp of when the Private Tag was added and when Private Contact ID was added. User 3 reviews previous messages exchanged between User 1 and the external party, and Private Tag and Private Contact ID that were added by User 2 and sends a text message to the external party. User 3 also adds a Private Status Code (e.g., ^Done). The Private Status Code is only visible to the members of the Chat Room and not visible to the external parties. The Private Status Code is added to the WfM record along with the ID of User 3, the date and time stamp of when the Private Status Code was entered in the Chat Window. User 3 enters Private Comments to summarize the outcome (e.g., \\ The client asked a good question. We should probably update our website and send out a communication to other clients"). The Private Comments are only visible to the members of the Chat Room (authorized users) and not visible to external parties. The WfM record is automatically updated with the date and time stamp of when Private Comments were entered and the ID of User 3. User 3 archives the Collaboration Space, and it is removed (hidden) from the Chat Room along with its Chat Window. The corresponding WfM record is automatically updated with the status 'Complete', date and time stamp of when the Collaboration Space was archived and with the ID of User 3.
Figure 20:
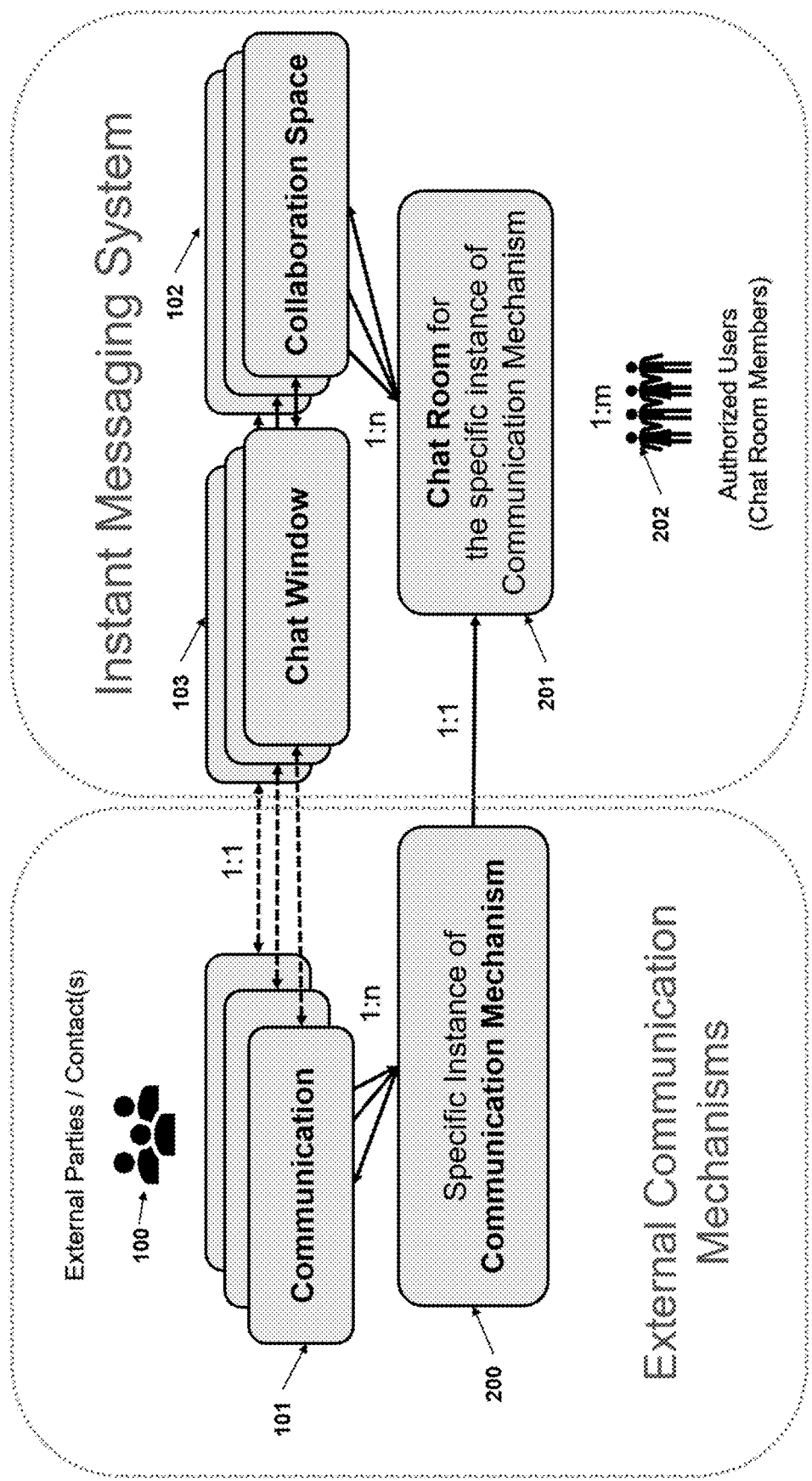
FIG. 20 is a chart that summarizes relationships between different components of an exemplary embodiment of the present invention related to integration of external communication mechanisms with the organization's IM System. Communication Mechanisms (200) are used by External Parties/Contacts (100) to send Communications (101). An example of a Communication Mechanism (200) can be a voicemail system, a text messaging service, a live chat service, or an online form, or a portal for uploading files. An example of a Communication (101) can be a voicemail message, a text messaging session, a live chat session, or a form filled out and submitted by an external contact. An organization may have multiple instances of Communication Mechanisms (200) of the same type. For example, there could be multiple voicemail boxes that are used for difference purposes—a voicemail box for external parties who call the organization's main auto attendant's numbers if no one answers the call—is an example of one instance of a Voicemail Box (Communication Mechanism). A single instance of a Communication Mechanism (200) can be used to receive multiple communications (101) (1 instance of a Communication Mechanism can be used to receive n communications (1-to-n)). E.g., multiple voicemail messages (Communications) can be received through the same instance of a Voicemail Box Communication Mechanism. In the present invention, a unique Chat Room (201) is set up for each instance of a Communication Mechanism (200). Multiple authorized users (202) can access the content of the same Chat Room (201) (1 Chat Room can be accessed by m authorized users (1-to-m)). A unique Collaboration Space (102) is set up in a Chat Room (201) for each instance of Communication (101) received through the instance of the Communication Mechanism (200). For example, there is only one Collaboration Space per each voicemail message received through main company's auto attendant voicemail box. Each Collaboration Space (102) contains one Chat Window (103). Authorized users (202) of the Chat Room (201) can access any of its Chat Windows (103) to view the content of the received Communication (101) and to enter their comments, observations, findings, action items, etc. or to exchange their messages with other authorized users (202) or external parties (100), depending on which communication mechanism is used. Each received external Communication (101) is posted in the corresponding Chat Window (103), one Communication (101) per each Chat Window (103) and vice-versa.
Figure 21:
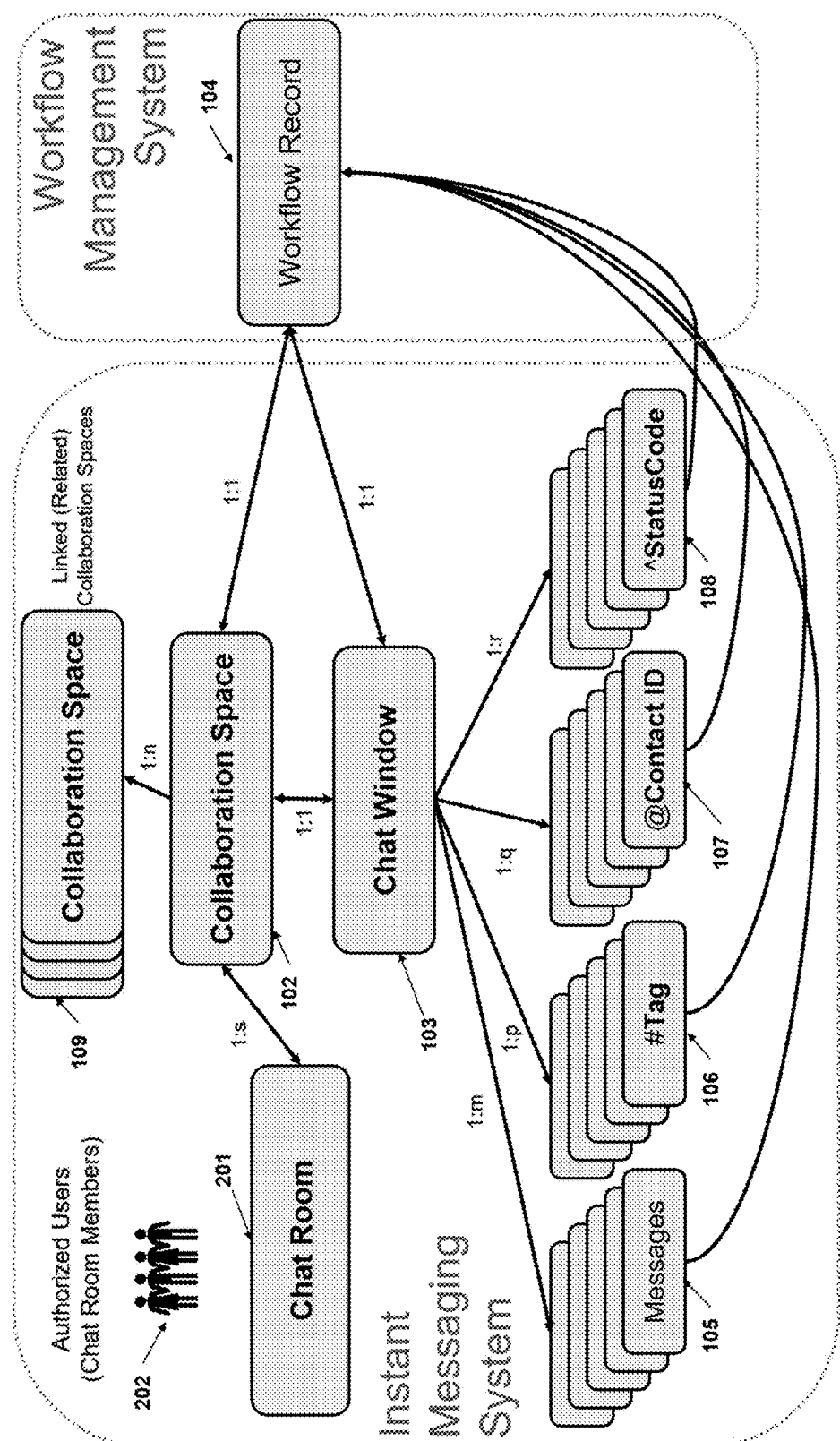
FIG. 21 is a chart that summarizes relationships between different components of an exemplary embodiment of the present invention related to integration of the organization's IM System with the WfM System. A unique Collaboration Space (102) is automatically created for each received communication (FIG. 20, 101) from an external party (FIG. 100) in a Chat Room (201) that is dedicated to the instance of the Communication Mechanism (FIG. 20, 200) used to receive that communication. Each Collaboration Space (102) contains one Chat Window (103). A new record in the WfM System (104) is automatically created for each Chat Window (103) of a Collaboration Space (102) dedicated to the received external communication (FIG. 20, 101). The WfM record (104) is automatically updated in real-time each time new content is added in the Chat Window (103) of the Collaboration Space (102). Each time a new instant message (105) is added in the Chat Window (103) either by a Chat Room's authorized user (202) or by an external party (100), a corresponding record in the WfM System (104) is automatically updated with a time stamp and a user ID. Each time a new Private user-defined tag, e.g., #Tag, (106) is added in the Chat Window (103), that tag is automatically added to the corresponding record in the WfM system (104). Each time a new Private Contact ID, e.g, @Contact ID, (107) is added in the Chat Window (104), that Contact ID is automatically added to the corresponding record in the WfM system (104). Each time a new Private Status Code, e.g., ^Status_Code (108) is added in the Chat Window (103), that Status Code is automatically added to the corresponding record in the WfM system (104) along with the date and time stamp and the user ID. A Collaboration Space (102) can be linked to several previously created Collaboration Spaces (109) potentially from different Chat Rooms that can be related to the current communication (FIG. 20, 101) in one way or another. For example, previous Collaboration Spaces created for the same client (e.g., previous communications from the same client) or previous Collaboration Spaces created for same product or service, or for the same project, etc.

Referring now to FIGS. 1 through 21, the present invention may include the following components:
External contact or party.
External communication mechanisms.
Communication.
Workflow Management System (WfM System).
Instant Messaging System (IM System).
Authorized user (Chat Room member).
Chat Room.
Collaboration Space.
Chat Window.
Private comment.
Private user-defined tag.
Private Status Code.
Private Contact ID.
Aggregated view.
Linked Collaboration Spaces.

External contact or party can be a visitor, client, customer, partner, supplier, vendor, prospective client, a company, or other types of persons or entities.

External Communication Mechanism is a system, device or service that can allow External Parties to send, receive, share or exchange their messages or content with an organization. There are different types of external communication mechanisms, for example
    Auto attendant for voice calls, voicemails and text messages.
    Text or multimedia messaging service.
    Live chat widget or app.
    Online form.
    Portal for uploading files and records.
    Social media messaging service.
    Fax device or service.

It's important to differentiate between types of external communication mechanisms and instances of external communication mechanisms. Examples of instances of external communication mechanisms could be any of the following:
    A specific instance of an auto attendant. An auto attendant may have one or more phone numbers assigned to receiving voice calls and text messages, and it may include one or more Integrated Voice Response (IVR) menu interfaces for handling incoming voice calls, e.g., CHQ auto attendant.
    Auto attendant—France.
    Auto attendant—Benelux.
    Auto attendant—Support team.
    A live chat widget on a specific web page, or in a desktop or mobile app:
        Live chat on the global home page (WW).
        Live chat on the regional home page (e.g., France, Benelux).

Live chat on the functional page (e.g., support page, billing page, payment page).

A specific online form:
New patient form.
Patient information update form.
Authorization for recurring monthly payments form.

A specific portal for uploading files and records:
Portal for uploading government-issued photo IDs.
Portal for uploading patient's X-rays or health records.

A Communication is defined as a unit of content or information that is exchanged between one more External Parties and representatives of an organization. A communication can include a question, a request, an answer, a statement, a document, a record, a file or other types of data. Communications can come in different types of formats, such as audio and video files, text, machine readable files, or content on different types of computer storage. Communications can be uni-directional or bi-directional. An example of a uni-directional communication can be a voicemail message, a form, a file, a review. An example of a bi-directional communication can be a text messaging session, a live chat session, a social media session, a phone conversation. A Communications can be sent and received through a Communication Mechanism.

Workflow Management System (WfM System), in the context of the present invention, is a database that maintains information about communications that are subject to tracking, such as voicemail messages, text and multimedia messages, live chats, social media messages, online forms and uploaded files. Users can only view and access the records and content in the WfM System they are authorized to. As an example, a user can access only voicemails for a specific auto attendant, or only live chats on a specific web page. Workflow records can be aggregated by one or more attributes, such as status (open vs. completed), by client, by type/mechanism (e.g., voicemail messages received through a specific auto attendant vs. text messages received through a specific auto attendant vs. live chat messages received through a specific web page). The WfM system can be configured to generate and send out periodic reports (e.g., hourly, daily, weekly), depending on the nature of the business—for example, to show if any of the received communications have not yet been handled. The WfM system can also be used for purposes of identifying trends, for purposes of analytics, as well as for purposes of tracking internal metrics and measurements, quality control and training purposes.

Instant Messaging System (IM System) is an online capability that enables real-time transmission of text or multimedia content over the Internet. The system can be used for synchronous and asynchronous one-to-one direct communication, one-to-many or many-to-many communication.

Chat Room is part of the IM System that enables synchronous or asynchronous conferencing, and online discussions for sharing information textually among an authorized group of users (authorized users or members of the Chat Room). In the present invention, a dedicated Chat Room is set up for each instance of the External Communication Mechanism, such as for each of the auto attendants, for each of the online forms, for each of the file-upload-portals. As an example, a Chat Room is created and configured for voicemail messages received through a Corporate Headquarters (CHQ) auto attendant (CHQ auto attendant voicemails), another Chat Room is set up for text messages received through a CHQ auto attendant (CHQ auto attendant text messages), another Chat Room is set up for messages received through a live chat widget on the company's home page (Home page live chats). Team members who are authorized to access specific communications are added to the respective Chat Room as participants or members. Different Chat Rooms can have different design, features and behavior. Some Chat Rooms by design are private—only accessible by their participants, e.g., all messages entered in Chat Rooms for voicemails, forms, or uploaded files are private and thus visible only to its authorized users. External parties who left voicemails, uploaded files or submitted online forms will not have access to any of the messages exchanged in the respective Chat Rooms. Other Chat Rooms, such as Chat Rooms for text and live chat sessions, can be used both for private real-time discussions between its participants (which will not be visible for external parties) and for real-time interaction with visitors (external parties).

A Chat Room for voicemail messages can maintain information about voicemail messages as well as the content of voicemail messages (caller ID, date and time stamp, duration, transcription of the voicemail, link to play the voicemail). Participants of a voicemail Chat Room can access voicemail messages and exchange private messages about how to handle received voicemail, or document their own observations, comments and findings.

A Chat Room for text messages can maintain information about caller ID, date and time stamp and content of text messages. Participants of a text messaging Chat Room can respond to the sender, to send and receive text messages during the texting session, or they can exchange private messages internally, that will be visible only to the authorized users who are members of that room. Private messages will not be visible to external parties. The text messaging Chat Rooms can be configured in a way that external parties can see no information about users who respond to their message (only the name of organization), or in a way that external parties can see limited information about the users who are interacting with them (e.g., first name and last name initial, or full name, or email address etc.). When a first text message is received from an external party or a first text message is sent to an external party, a new texting (interactive) session is started. The Chat Window where text messages are exchanged remains open until an authorized user archives or closes the Collaboration Space. After the Collaboration Space is archived, the next text message from or to the same external party will automatically create a new Collaboration Space with a new Chat Window and will start a new text messaging session.

A Chat Room for live chat messages can maintain information about visitors, e.g., IP address (and potentially other pertinent information, such as type of device, type of OS, geographical location, country, city, etc.), as well as date and time stamp and content of the received message. Similarly to the text messaging Chat Room, in a Chat Room for live chats, participants can respond to the visitor, to send and receive messages during the live chat session, or they can exchange private messages internally, which will be visible only to the authorized users who are members of that room. The private messages will not be visible to the visitor. The Chat Rooms for live chats can be configured in a way that visitors can see no information about users who respond to their message (e.g., only the name of organization), or in a way that visitors can see limited information about the users who are interacting with them (e.g., first name and last name initial, or full name, or email address etc.). A Chat Room for live chats can be configured to automatically close or be archived as soon as the visitor closes the chat window.

A Chat Room for forms can maintain information about External Parties (e.g., name, email address, phone or account number), date and time stamp and link to access the form, and its participants can exchange private messages internally about reviewing or processing the form.

A Chat Room for uploaded files can maintain information about External Parties (e.g., name, email address, phone or account number), date and time stamp and link to access the uploaded file, and its participants can exchange private messages internally about reviewing or processing the received file.

Collaboration Space is a part of Chat Room. It is an isolated, self-contained discussion thread that is dedicated to a single instance of received Communication (e.g., one voicemail, one text messaging session, one live chat session, one form received, or one file uploaded through a public website). In the invention, a new discussion thread (a new Collaboration Space) is automatically generated for each Communication received from an External Communication Mechanism: for each voicemail, for each received form, or an uploaded file, or for each new text or live chat or social media messaging session. While a Chat Room is set up for each instance of Communication Mechanism, a Collaboration Space is set up for each instance of communication received through that Communication Mechanism. Thus, a Chat Room typically will contain several Collaboration Spaces. Each Collaboration Space is made of one Chat Window, where the content of the received communication is automatically added, and where follow-up private and/or public discussions can occur depending on the type of the Collaboration Space. Authorized users (members) of a Chat Room can access any of the Collaboration Spaces the Chat Room contains.

Each Collaboration Space by design has a lifecycle that consists of a series of stages through which received communications are tracked in a WfM System. A new Collaboration Space is automatically created when a new communication is received from an external party through the External Communication Mechanism configured for its parent Chat Room. A Collaboration Space is created with a set of attributes automatically extracted from the received Communication, such as Caller ID and the time stamp in case of a voicemail or text message, IP address and time stamp in case of a live chat message, social media account ID in case of a social media message, Client ID and time stamp in case of a submitted form or uploaded file. When the Collaboration Space is created, a new message containing details about the received communication is automatically generated in its Chat Window. In the case of a voicemail the details may include its duration, transcription of the voicemail message, link to play the voicemail message and so on. In case of a text message or live chat details may include its content. In case of a form or an uploaded file received through one of web pages, details may include a link to the filled-out form or the uploaded file.

When a new Collaboration Space is created for a received communication, and the first automatically generated message is posted in its Chat Window, a new record is automatically added in the WfM System. The record in the WfM System is automatically populated with the details of the received communication, such as information about the contact who initiated the communication, type of communication (e.g., voicemail, text or multimedia message, live chat message, social media message, online form, or upload portal), the instance of the communication mechanism used to receive the incoming communication (e.g., a specific auto attendant, a specific web page, a specific online widget or property).

When an authorized user opens the first message in the Chat Window of the Collaboration Space for the first time, the corresponding record in the WfM System is automatically updated with the status 'Opened', the date and time stamp of when the item was opened, and with the user ID of the team member who opened the Collaboration Space and the message.

Each time a new message is entered in the Collaboration Space, the corresponding record in the WfM System is automatically updated with the date and time stamp of when the last message was entered, and the user ID of the authorized participant that posted that message.

A Collaboration Space remains open as long as the discussion continues in its Chat Window, or until it is archived. For example, while a team member is exchanging live chat or text messages with the visitor, or while a team member is discussing a received voicemail with other participants, the Collaboration Space remains open.

After a received incoming communication (e.g., a voicemail message) has been handled, the Collaboration Space can be archived by one of the authorized users, or automatically archived, for example, in case a visitor leaves their live chat window. When a Collaboration Space is archived, the corresponding record in the WfM System is automatically updated with the status 'Complete', the date and time stamp of when it was closed (completed) and the ID of the user who closed it or archived it. In addition. In some Chat Rooms a Collaboration Space can be automatically archived, for example, in case a visitor leaves their live chat window. In that case, the WfM record can be updated with the status 'Timed-out'.

Authorized users can enter Private Comments in the Chat Window of Collaboration Space that will be visible only internally to members of the Chat Room, but not visible to external parties. Private comments can be added by using an on-screen menu or with a special syntax, such as \\ to make all remaining text on the line until the end of the line as a private comment.

to mark all the text contained in between << and >> as a private comment (e.g. << this is a private comment >>).

Private Comments can be highlighted with unique color-coding and/or formatting, for example with a different background or placed in a special box.

By default, all discussion items in Chat Windows of Collaboration Spaces created for Voicemails, Forms, or Uploaded files are treated as Private Comments automatically, and optionally can be automatically encapsulated with the same syntax used in the other Collaboration Spaces such as \\ or <<. . . >> for purposes of maintaining consistent look and feel of Private Comments across all types of Collaboration Spaces.

Private user-defined tags are unique identifier that can reference a concept, an idea, a parameter or a category that has a certain meaning for users and can help them flag, organize, classify or categorize communications received from or exchanged with external parties. Authorized users can manually add previously defined or create new tags in real-time in a Chat Window of a Collaboration Space by using a format like #tag_name. Private tags are only visible internally within the IM System and the WfM system and are not visible to external parties.

Tags can be suggested automatically by the system by analyzing the source or content of the incoming communication or subsequent discussions. For example, if a specific product or service is mentioned, an appropriate tag can be suggested based on the name of that product or service—for a text message referencing Entrecom service, a tag #Entrecom can be suggested. An authorized user can accept or reject tags that were suggested automatically as needed.

Private Status Code is a word or a short expression describing the status or the progress on handling a communication. Status Code is a word prepended with a special character (e.g., ^symbol). For example, Status Codes such as ^Reviewing, or ^In_progress, or ^Waiting_for_callback will be automatically added to the status field in the WfM record as 'Reviewing', 'In Progress', 'Waiting for callback'. The Status Code can be entered in the Chat Window of a Collaboration Space in the IM System at any time and is visible only to the authorized users and is not visible to external parties.

Private Contact ID. Authorized users can manually assign private Contact IDs to uniquely identify an external party (@Contact_ID or @Contact_Name). A Private Contact ID can be set up with several parameters, such as Full Name, phone numbers, email addresses, mailing addresses, an account number, date of birth, etc. Private Contact IDs are only visible internally in the IM System and WfM System and are not visible to external parties.

Private Contact IDs can be suggested automatically by the system by analyzing the source or content of the incoming communication. For example, a voicemail from a phone number associated with a specific contact will suggest the corresponding Contact ID (e.g., @PeterJones19450401). An authorized user can accept or reject Contact IDs that were suggested automatically as needed.

Aggregated View. Multiple Collaboration Spaces may contain communications and additional content (e.g., comments, observations, action items, etc.) that are closely related to each other. In some cases it can be useful to see all the communications received or exchanged with the same Contact ID and the content added by the team privately or publicly related to those communications at a glance in one place (as opposed to having to open multiple Chat Windows and try to see content of each of them one at a time). The current invention offers a capability to display and view aggregated content from multiple Collaboration Spaces and their Chat Windows, which is referred to as an Aggregated View. FIG. 13 shows an example of an Aggregated View by Client. The Aggregated View includes the content from all the Chat Windows of the Collaboration Spaces that were created for communications with the selected client. The Aggregated View can also be generated by consolidating content from multiple Collaboration Spaces that include one or more specific Private Contact IDs, Private user-defined Tags or Collaboration Spaces that meet other criteria. The Aggregated View can also be restricted to a subset of Collaboration Spaces that were created during a certain period of time (e.g., last 30 days or last 90 days, last year, or $3^{rd}$ Quarter). The Aggregated View can display the content of the applicable Chat Windows sorted in chronological or reverse chronological order or based on other criteria.

Linked Collaboration Spaces. A Collaboration Space for a specific communication can be related to other Collaboration Spaces, e.g., Collaboration Spaces created for previous communications from the same external party, or Collaboration Spaces created for the same product, service, project or initiative. Those inter-related (or Linked) Collaboration Spaces can be part of the same or other Chat Rooms. Each Collaboration Space can be associated with one or more linked Collaboration Spaces through various criteria (e.g., related to the same Private Contact IDs or the same Private Tags). A number of linked Collaboration Spaces can be viewed and accessed at the same time for cross-referencing purposes.

These above-mentioned necessary elements work individually and together to enable the present invention to perform its desired function through the following steps:

Step 1. A Chat Room is created for each of type and instance of the mechanisms used to receive communications. Each Chat Room is configured with a title that reflects the type of communication, the instance of the mechanism used to receive communications, and potentially other relevant details of the incoming communication.

For example, a Chat Room that is used to receive voicemails from the company's main auto attendant phone numbers might be titled 'CHQ auto attendant voicemail' or a Chat Room that is used to receive text messages sent through the company's main auto attendant numbers could be titled 'CHQ auto attendant text messages'.

Step 2. A Workflow Management System (WfM System) is configured to receive input from each of the Chat Rooms set up for incoming communications.

Step 3. A new voicemail is received through one of the company's auto attendant numbers.

Step 4. A new Collaboration Space is automatically created for the received voicemail in the respective Chat Room (e.g., 'CHQ Auto Attendant Voicemail'). The title of the new Collaboration Space is <Caller ID>+<date and time stamp> (e.g., '617-555-1212|7/15/2018 10:13:10').

Step 5. A new message is automatically added to the new Collaboration Space with the following content:
Phone number (Caller ID).
Date and time stamp when the voicemail was received.
Duration (e.g., XX seconds).
Transcribed content of the voicemail message.
Link to listen to the voicemail message.

Step 6. A new record is automatically added to the WfM System containing the date and time stamp, contact's Caller ID, type (Voicemail), the name of the instance of the Communication Mechanism (which is also the name of the corresponding Chat Room), and a link to access the respective Collaboration Space.

Step 7. When one of authorized users opens the Collaboration Space, the corresponding record in the WfM System is automatically updated with the date and time stamp of when the Collaboration Space was first accessed (Opened), and with the user ID of the Chat Room member who accessed the Collaboration Space (Opened By).

Step 8. One or more participants type their messages discussing how to handle the voicemail or to enter their own observations, comments, findings or documenting an outcome. All messages in the Voicemail Collaboration Space are private and can only be accessed internally by authorized users (who are members of the Chat Room that contains the Collaboration Space).

An authorized user can add a Private Tag (e.g., by using a format like #tag_name. Private Tags are visible only internally and are not visible to external parties.

An authorized user can also assign a Private Contact ID (e.g, @Contact_ID or @Contact_Name). Contact IDs are only visible internally and is not visible to external parties.

Step 9. The corresponding record in the WfM System is automatically updated with
The date and time stamp of when the last message was typed (date and time stamp of the last action), as well as The user ID of the team member who typed the last message (user ID of the last action).

Step 10. After the received voicemail has been handled, one of the authorized users can archive the Collaboration Space. When the Collaboration Space is archived it is automatically removed (hidden) from the Chat Room. The Collaboration Space can continue to be accessed via the link from the corresponding WfM System record.

Step 11. The corresponding record in the WfM System is automatically updated with
The status 'Complete'.
The date and time stamp of when the corresponding Collaboration Space was archived and
The ID of the team member who archived the Collaboration Space.

Step 12. A new text message is received through one of the company's auto attendant numbers.

Step 13. A new Collaboration Space is automatically created for the received text message in the corresponding Chat Room (e.g., 'CHQ Auto Attendant Texting'). The title of the new Collaboration Space is <Caller ID>+<date and time stamp>(e.g., '617-555-1212|7/15/2018 10:13:10').

Step 14. A new message is automatically posted in the new Collaboration Space with the content of the received text message, the phone number of the external party and the date and time stamp. E.g., "617-555-1212|7/15/2018 10:13:10" (see FIG. 8).

Step 15. A new record is automatically added to the WfM System that contains the date and time stamp, contact's Caller ID, type (Text Message) and the name of the instance of the Communication Mechanisms (which is also the name of the corresponding Chat Room), and a link to access the respective Collaboration Space.

Step 16. When one of authorized users opens the Collaboration Space, the corresponding record in the WfM System is automatically updated with the date and time stamp of when the Collaboration Space was first accessed (Opened), and with the user ID of the Chat Room member who accessed the Collaboration Space (Opened By).

Step 17. One or more participants can type their messages to respond and exchange text messages with the contact. An authorized user can also enter private comments intended for internal use only. Private comments will not be visible to external parties. Private comments can be added with some special syntax or by using an on-screen menu. Private comments are highlighted with unique color-coding and/or formatting, for example with a different background or placed in a special box.

An authorized user can assign a Private Tag (e.g., by using a format like #tag_name). Private Tags are only visible internally and are not visible to external parties. An authorized user can also assign a Private Contact ID (e.g, @Contact_ID or @Contact_Name). Private Contact IDs are only visible internally and are not visible to external parties.

Step 18. Each time a message is entered in the Collaboration Space, the corresponding record in the WfM System is automatically updated with
The date and time stamp of when the last message was typed (date and time stamp of the last action), as well as
The user ID of the team member who typed the last message (user ID of the last action).

Step 19. After the exchange of text messages has been completed, one of the authorized users can archive the Collaboration Space. When the Collaboration Space is archived it is automatically removed (hidden) from the Chat Room. The Collaboration Space can continue to be accessed via the link from the corresponding record in the WfM System.

Step 20. The corresponding record in the WfM System is automatically updated with
The status 'Complete'.
The date and time stamp of when the corresponding Collaboration Space was archived and
The ID of the team member who archived the Collaboration Space.

Step 21. An authorized user can open an aggregated view of all Collaboration Spaces related to a specific Private Contact ID, or specific Private Tag.

With that said, some elements and components can be shuffled, interchanged, or reconfigured to cause the invention to perform an identical or similar function.

The computer-based data processing system and method described above is for purposes of example only and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer. It is further contemplated that the present invention may be run on a stand-alone computer system or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatuses configured to implement the method are within the scope of the present invention.

It should be understood, of course, that the foregoing relates to exemplary embodiments of the invention and that modifications may be made without departing from the spirit and scope of the invention as set forth in the following claims.

What is claimed is:

1. A method for three-way integration of external communication mechanisms with an organization's Instant Messaging (IM) system and Workflow Management (WfM) system, wherein the IM system comprises one or more chat rooms, the method comprising:
receiving and storing a communication sent by an external party through an instance of a communication mechanism;
automatically generating a collaboration space within a chat room associated with the instance of the communication mechanism used to receive the communication;
automatically generating a message within the collaboration space and populating it with content of the received communication or information about the content of the received communication;

automatically generating and populating a record in the WfM system to track a status and progress of handling the received communication;

limiting access to the chat room to authorized users that are members of the chat room; and allowing an authorized user to add private comments to chat windows within that chat room that are visible only to members.

2. The method of claim 1, wherein the collaboration space comprises a chat window, and an authorized user is allowed to use the chat window to send and receive communications through interactive external communication mechanisms.

3. The method of claim 1, wherein the collaboration space comprises a chat window, and an authorized user is allowed to use the chat window to access one-way incoming communications received from non-interactive external communication mechanisms.

4. The method of claim 1, wherein the collaboration space comprises a chat window, and an authorized user is allowed to use the chat window to exchange messages with other members of the chat room to coordinate and collaborate on addressing and handling of the received communications.

5. The method of claim 1, wherein the collaboration space comprises a chat window, and an authorized user is allowed to use the chat window to:

document one or more of observations, status, findings, comments, outcomes, planned or needed action items while addressing or handling received communications; and track execution of action items.

6. The method of claim 1, comprising automatically updating a record in the WfM system with one or more attributes captured from the received communication, or messages entered in the corresponding chat window, or one or more of date and time stamp, ID of the authorized user, and action performed by the authorized user, each time a new activity occurs in the corresponding chat window, or each time a new communication or new message is added to the chat window, or each time the collaboration space is archived.

7. The method of claim 1, wherein an authorized user is allowed to access content of one or more previously archived collaboration spaces, wherein the content of the one or more previously archived collaboration spaces includes received communications and all messages entered by participants in the one or more previously archived collaboration spaces.

8. The method of claim 1, wherein the collaboration space comprises a chat window, and an authorized user is allowed to:

add a new user-defined tag to a message in the chat window; or view, select and assign one or more existing tags to the message in the chat window.

9. The method of claim 8, wherein each tag is automatically color-coded and highlighted with a distinct background pattern.

10. The method of claim 8, wherein each of the assigned tags is automatically added to the record in the WfM system that corresponds to the chat window in which the tags are assigned.

11. The method of claim 1, wherein the collaboration space comprises a chat window, and the IM system is configured to automatically generate suggested tags in the chat window based on the external party which sent the communication, or based on content of messages in the chat window.

12. The method of claim 11, wherein an authorized user is allowed to accept or reject the automatically generated tags for the received communications and messages entered in the chat window.

13. The method of claim 1, wherein the collaboration space comprises a chat window and is configured to permit an authorized user to add a status code directly in the chat window.

14. The method of claim 13, wherein each status code is automatically color-coded and highlighted with a distinct background pattern.

15. The method of claim 13, wherein the status code is automatically updated in the record of the WfM system that corresponds to the chat window in which the status code was added.

16. The method of claim 1, wherein the collaboration space comprises a chat window, and an authorized user is allowed to:

assign a new contact ID to a message in the chat window; or view, select and assign one or more existing contact IDs to the message in the chat window.

17. The method of claim 16, wherein the IM system is configured to automatically identify relevant one or more of existing contact IDs for assignment to the message in the chat window based on one or more of an external party associated with the message, or on a content of the message.

18. The method of claim 17, wherein an authorized user is allowed to accept or reject the automatically identified contact IDs.

19. The method of claim 16, wherein each contact ID is automatically color-coded and highlighted with a distinct background pattern.

20. The method of claim 16, wherein the IM system is configured to automatically add the assigned contact IDs to the record in the WfM system that corresponds to the chat window in which the contact IDs are assigned.

21. The method of claim 1, wherein all private comments are automatically color-coded and highlighted with a distinct background pattern.

22. The method of claim 1, wherein an authorized user is allowed to hide and unhide private comments in the chat windows.

23. The method of claim 1, wherein, a link in the WfM system record is generated automatically to access information and details about corresponding communication, including the collaboration space with all the documented discussions, comments, conclusions and other interactions that occurred in the process of handling the received communication, all for purposes of operation, auditing, performing reviews, quality control or training.

24. The method of claim 1, comprising:

automatically consolidating status information on different types of communications into a single WfM system; and allowing users to view at a glance communications that have been received and not yet handled, regardless of the type of communication.

25. The method of claim 1, comprising generating workflow reports that are configured per user preferences based on records maintained in the WfM system, and distributing those reports based on a user-defined frequency or on user demand.

26. The method of claim 1, comprising enabling an authorized user to select one or more criteria and view a subset of WfM records that match those criteria.

27. The method of claim 1, comprising suggesting a link between two or more collaboration spaces based on one or more of the external party who sent the communication, the content of the messages in the chat window of the collaboration space, a tag, or a contact ID.

28. The method of claim 1, comprising enabling an authorized user to link two or more collaboration spaces, and display the linked collaboration spaces in one read-only automatically generated chat window.

29. The method of claim 1, comprising enabling an authorized user to view one or more collaboration spaces in one read-only automatically generated chat window related to one or more contact IDs, one or more tags, or to one or more status codes.

\* \* \* \* \*